US012648580B2

(12) United States Patent
Ong

(10) Patent No.: US 12,648,580 B2
(45) Date of Patent: Jun. 9, 2026

(54) SCALABLE METHODS FOR MANUFACTURING ALTERNATIVE MEAT CUTS

(71) Applicant: ANTS INNOVATE PTE. LTD., Singapore (SG)

(72) Inventor: Shujian Ong, Singapore (SG)

(73) Assignee: ANTS INNOVATE PTE. LTD., Singapore (SG)

( * ) Notice: Subject to any disclaimer, the term of this patent is extended or adjusted under 35 U.S.C. 154(b) by 218 days.

(21) Appl. No.: 18/549,468

(22) PCT Filed: Mar. 9, 2022

(86) PCT No.: PCT/EP2022/056033

§ 371 (c)(1),
(2) Date: Sep. 7, 2023

(87) PCT Pub. No.: WO2022/189505

PCT Pub. Date: Sep. 15, 2022

(65) Prior Publication Data

US 2024/0148024 A1 May 9, 2024

(30) Foreign Application Priority Data

Mar. 9, 2021 (SG) ........................... 10202102384X

(51) Int. Cl.
*A23J 3/22* (2006.01)
*A23J 3/26* (2006.01)
(52) U.S. Cl.
CPC ................. *A23J 3/227* (2013.01); *A23J 3/26* (2013.01)

(58) Field of Classification Search
CPC ........ A23L 27/26; A23L 27/215; A23J 3/227; C12N 5/0656; C12N 5/0658
(Continued)

(56) References Cited

U.S. PATENT DOCUMENTS 3,801,713 A 4/1974 Tolstoguzov
6,835,390 B1 12/2004 Vein
(Continued)

FOREIGN PATENT DOCUMENTS

WO WO 1999031223 6/1999
WO WO 2018227016 6/2018
(Continued)

OTHER PUBLICATIONS

Aschemann-Witzel et al. (2020) "Plant-based food and protein trend from a business perspective: markets, consumers, and the challenges and opportunities in the future" Critical Reviews in Food Science and Nutrition 1-10 doi:10.1080/10408398.2020.1793730.
(Continued)

*Primary Examiner* — Brent T O'Hern
(74) *Attorney, Agent, or Firm* — FisherBroyles, LLP; Cara L. Crowley-Weber; Kun Ma

(57) ABSTRACT

This invention relates to scalable methods for the production of artificial meat products that mimic the appearance, texture, and mouthfeel (ATM) of natural meat cuts. These methods involve providing multiple building blocks of edible protein, such as grooved sheets, fibrils or fibres of edible protein, and combining the building blocks with an edible binder to produce the artificial meat product. Methods are provided along with apparatus for performing the methods and artificial meat products produced by the methods.

14 Claims, 20 Drawing Sheets

A

B

(58) Field of Classification Search
    USPC ........................................................ 426/533
    See application file for complete search history.

(56)                    References Cited

U.S. PATENT DOCUMENTS

| | | | |
|---|---|---|---|
| 2003/0157219 A1 | 8/2003 | Bijl | |
| 2003/0211228 A1 | 11/2003 | Ballard | |
| 2020/0100525 A1* | 4/2020 | Savir | A23L 13/65 |
| 2024/0306685 A1* | 9/2024 | Ong | A23J 3/227 |

FOREIGN PATENT DOCUMENTS

| | | |
|---|---|---|
| WO | WO 2019016795 | 1/2019 |
| WO | WO 2019211189 | 11/2019 |
| WO | WO 2020030628 | 2/2020 |
| WO | WO 2020149791 | 7/2020 |
| WO | WO 2020152689 | 7/2020 |
| WO | WO 2020191505 | 10/2020 |
| WO | WO 2020222239 | 11/2020 |
| WO | WO 2020243324 | 12/2020 |
| WO | WO 2020252388 | 12/2020 |
| WO | WO 2021102375 | 5/2021 |

OTHER PUBLICATIONS

Ben-Arye et al. (2019) "Tissue Engineering for Clean Meat Production" Frontiers in Sustainable Food Systems 3: 46-46.
Bounie et al. (2020) "The role of food science and technology in humanitarian response" Trends Food Sci Technol 103:367-375 doi:https://doi.org/10.1016/j.tifs.2020.02.010.

Chen (2007) "Surface texture of foods: perception and characterization" Crit Rev Food Sci Nutr 47:583-598 doi:10.1080/10408390600919031.
Cornet et al. (2021) "Thermo-mechanical processing of plant proteins using shear cell and high-moisture extrusion cooking" Critical Reviews in Food Science and Nutrition 1-18 doi:10.1080/10408398.2020.1864618.
Datar et al. (2010) "Possibilities for an in vitro meat production system" Innovative Food Science and Emerging Technologies 11:13-22 doi:10.1016/j.ifset.2009.10.007.
Huff et al. (2005) "Stress Response Differences and Disease Susceptibility Reflected by Heterophil to Lymphocyte Ratio in Turkeys Selected for Increased Body Weight1" Poultry Science 84:709-717 doi:https://doi.org/10.1093/ps/84.2.328.
Handral et al. (2020) "3D Printing of cultured meat products" Critical Reviews in Food Science and Nutrition 1-10 doi:10.1080/10408398.2020.1815172.
Kang et al. (2020) "Engineered Whole Cut Meats Assembled of Cell Fibers Constructed by Tendon-Gel Integrated Bioprinting" In Review.
MacQueen et al. (2019) "Muscle tissue engineering in fibrous gelatin: implications for meat analogs" npj Science of Food 3:20 doi:10.1038/s41538-019-0054-8.
Ong et al. (2020) "Cell-based meat: Current ambiguities with nomenclature" Trends in Food Science & Technology 102:223-231.
Pena-Gonzalez et al. (2019) "Ultrasound as a potential process to tenderize beef: Sensory and technological parameters" Ultrasonics Sonochemistry 53:134-141.
Wattanachant et al. (2005) "Microstructure and Thermal Characteristics of Thai Indigenous and Broiler Chicken Muscles" Poultry Science 84:328-336.

* cited by examiner

B

A

C

B

A

B

A

B

A

Peeled

Cooked

Uncooked

C

SCALABLE METHODS FOR MANUFACTURING ALTERNATIVE MEAT CUTS

CROSS-REFERENCE TO RELATED APPLICATIONS

This application is a National Stage Application under 35 U.S.C. § 371 of PCT/EP2022/056033, filed on Mar. 9, 2022, which claims the benefit of priority to Singapore Patent Application No. 10202102384X filed on Mar. 9, 2021, the contents of which are incorporated by reference for all purposes.

FIELD OF THE INVENTION

The present invention relates to the production of artificial or alternative meat products, and, in particular cut meat products that mimic the appearance, texture, and mouthfeel (ATM) of natural meat.

BACKGROUND

Conventional meat production is known to be harmful to the environment, human health and raises animal ethical concerns[10]. Alternatives to meat have attracted significant attention among consumers in recent times. Key market drivers include consumer health consciousness, food safety concerns, food security issues, and concerns for environmental and society[11]. Meat alternatives include plant-based and fungi-based meats, cell-based meats and insect protein-based meats, differentiated based on the ingredients used[12]. Alternative meat products in the industry can be classified into "minced meat" and "whole meat cuts". Most players in the industry focus on developing minced meat products given its relative simplicity. Whole meat cuts are difficult to achieve given the need to precisely structure sizable pieces of alternative protein to achieve the texture and mouthfeel of meat.

Structuring alternative meats to form muscle-like whole meat cuts is challenging due to the complex structure of the muscle tissues. Muscle meat comprises bundles of fibres called muscle fibres arranged in an aligned manner, interlaced with intramuscular fat[13]. Achieving the intricate multi-scale structures of muscle meats require highly precise structuring methods. The major bottleneck of state-of-the-art technologies is the lack of ability to precisely engineer products without compromising the scalability or vice versa. Technologies like low-resolution 3D printing, shear cell and high-moisture extrusion cooking, and immersion rotary jet spinning while potentially scalable, does not allow the precision required to recapitulate meat-like ATM[4-7]. High-resolution 3D printing may allow precision but compromises speed and scalability[8-9].

BRIEF SUMMARY OF THE INVENTION

The present inventors have developed scalable methods of structuring edible proteins that enable the production of artificial meat products that mimic the appearance, texture, and mouthfeel (ATM) of natural meat cuts. These methods involve the use of microtechnology to produce protein building blocks and the assembly of these protein building blocks using edible binders to produce three dimensional structures that mimic natural meat cuts.

A first aspect of the invention provides a method of producing an artificial meat product, providing multiple building blocks of edible protein, and combining the building blocks with an edible binder to produce an artificial meat product.

A second aspect of the invention provides a method of producing an artificial meat product comprising providing multiple sheets of edible protein, introducing grooves into the surfaces of the sheets, applying an edible binder to the grooved sheets and assembling the grooved sheets to form the artificial meat product.

A third aspect of the invention provides a device or apparatus for the production of an artificial meat product comprising;

(i) a surface modifying element to imprint or cut grooves into a surface of a sheet of protein, (ii) a binder dispenser to apply binder to the grooved sheets, and (iii) an assembler to stack the grooved sheets with applied binder to produce the alternative meat product.

In some embodiments, a device or apparatus of the third aspect may further comprise a sheet forming element for producing sheets of edible protein.

In other embodiments, a device or apparatus of the third aspect may further comprise a sheet loading tray for loading sheets of edible protein into the device or apparatus.

A fourth aspect of the invention provides a method of producing an artificial meat product producing multiple fibrils of edible protein, combining the fibrils with a first edible binder to form fibres, and combining the fibres with a second edible binder to produce an artificial meat product.

The first edible binder may be more stable than the second edible binder.

A fifth aspect of the invention provides a method of producing an artificial meat product producing multiple fibres of edible protein, combining the fibres with a first edible binder to produce an artificial meat product.

A sixth aspect of the invention provides an artificial meat product comprising a stack of sheets of edible protein, each sheet in the stack having a grooved surface, the sheets being bound together with an edible binder.

An artificial meat product of the sixth aspect may be produced by a method of the second aspect, for example using a device or apparatus of the third aspect.

A seventh aspect of the invention provides an artificial meat product comprising a set of fibres bound together with a second edible binder, each fibre comprising multiple fibrils of edible protein bound together with a first edible binder.

An artificial meat product of the seventh aspect may be produced by a method of the fourth or fifth aspect. Other aspects and embodiments of the invention are described in more detail below.

DETAILED DESCRIPTION OF THE INVENTION

Figure 1:
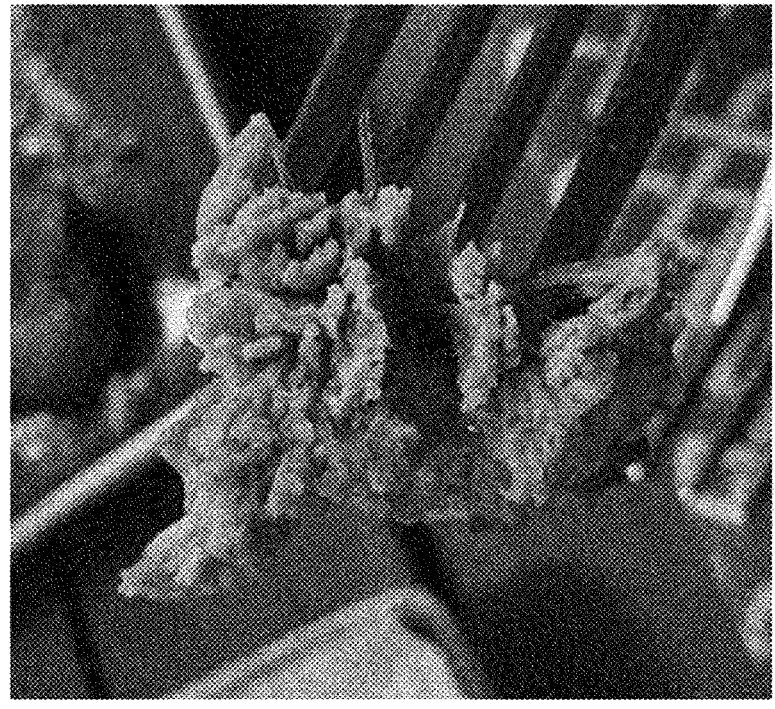
FIG. 1 shows an example of muscle fibre separation in real whole meat cuts. (A) Cross-section cuts of Iberico Secreto Pork showing layers of muscles with textures contributed by muscle fibres (B) Separation of muscle meat into milli-scale and microscale muscle fibres and bundles after cooking and mastication.
Figure 1:
Figure 1:

The present inventors have developed scalable methods of producing artificial meat products that mimic natural meat cuts. These methods involve preparing building blocks of edible protein, such as fibres or sheets, at the microscale in a scalable manner and then assembling the building blocks into larger constructs for use as artificial meat products. Artificial meat products produced by these methods may for example, mimic the appearance, texture, and mouthfeel (ATM) of natural meat cuts. In particular, the artificial meat products may contain muscle fibre-like structures that separate upon cooking and/or mastication A method of producing an artificial or alternative meat product as described herein may comprise combining building blocks of edible protein with an edible binder to produce an artificial or alternative meat product.

A building block is a structural unit of edible protein that is used as described herein to construct three dimensional constructs for use as meat products. A building block may take any suitable form. Preferred building blocks include sheets of edible protein and fibrils or fibres of edible protein.

Building blocks as described herein may comprise or consist of edible protein. Any source of edible protein may be employed. The edible protein may include any protein suitable for dietary consumption, for example plant protein, microorganism protein, animal cell protein and/or meat protein.

Plant protein may be obtained from plants or plant material using standard techniques. In particular, plant protein may be obtained/derived from legumes (e.g. peas, lentils, lupines, chickpea, cowpeas, Bambara groundnut, peanut, navy beans, kidney beans, lima beans, string beans, pinto beans, black-eyed peas); tubers (e.g. potato, cassava, sweet potato, taro, yams); or grain (e.g. quinoa, amaranth, kamut, teff, farro, spelt, couscous, oats, wheat, buckwheat, millet, wheat berries, rice, corn, cornmeal).

Microorganism protein may be obtained from microorganisms using standard techniques. In particular, microorganism protein may be obtained/derived from algae, microalgae, cyanobacteria, yeast or fungi.

Animal cell protein for use in the methods described herein may be obtained from cultured non-human animal cells. Suitable methods for obtaining/producing animal cell protein for dietary consumption are well-known in the art, and are described e.g. in WO2021102375A1, WO2020243324A1, WO2019211189A1 WO1999031223A1, U.S. Pat. No. 6,835,390B1 WO2020252388A1, WO2020149791 A1, WO2019016795A1, WO2020222239A1 and WO2018227016A1. Methods for producing cultured non-human animal cells for dietary consumption may comprise obtaining/establishing a source of replicating cells, e.g. by isolating primary cells from animal tissue and subsequently establishing cell lines from the primary cells by immortal-ization, isolating and culturing self-replicating stem cells from animal tissue, or by culturing cells of an already established cell line, e.g. a cell line obtained from a reposi-tory such as ATCC. The cells are cultured under suitable conditions in appropriate growth media, and may be cul-tured in bioreactors and/or assembled on or with a "scaffold" to promote cellular differentiation to the desired cell type(s).

Meat protein for use in the methods described herein may be obtained from the muscles of non-human mammals, preferably a meat species such as cattle, pig, sheep, poultry, duck, deer, rabbit, fish or other seafood. For example, meat protein may be obtained from muscle tissue of a non-human mammal. In some embodiments, meat protein for use in the methods described herein may be obtained from a post-rigor carcass. In some preferred embodiments, the edible protein is non-meat protein or alternative protein. For example, the protein may be from a plant or from cultured non-human animal cells.

In addition to edible protein, a building block may further comprise one or more of fat, colourings and flavourings or other food additives. Fat may be e.g. solid fat, liquid fat, animal fat or plant fat, and may be provided as an emulsion. Natural or artificial colourings and flavourings may be mixed in at small quantities. Food additives include e.g. preservatives, flavour enhancers, fat replacers, nutrients, emulsifiers, stabilizers, thickeners, binders, texturizers, pH control agents and acidulants, leavening agents, anti-caking agents, humectants, enzymes and gases. Such additives may be included at quantities/proportions within ranges deemed safe by food regulatory authorities.

Building blocks may comprise species-specific cells, spe-cies-specific tissues and/or species-specific flavourings. It will be appreciated that the cells/tissues/flavourings are selected to correspond to the meat type of the artificial meat product. The physical properties of building blocks may be selected to match those of the relevant species. For example, the diameter of fibres of building blocks (following separa-tion) may be selected to be similar to the diameter of muscle fibres of muscle tissue from the relevant species.

Colours and quantities of food colourings may be selected to provide the building block/final artificial food product with an appearance matching that of the meat from the relevant species. For example, larger quantities of red colouring may be provided where the artificial food product is an artificial red meat, and smaller quantities of such colouring may be provided where the artificial food product is an artificial white meat.

The building blocks are bound together in the artificial meat product with one or more edible binders. The edible binder may be a food-grade binder. Suitable edible binders include plant-based hydrogels, synthetic hydrogels, tissues, proteins, extracellular matrices, and/or combinations thereof. Examples of such edible binders include, but are not limited to, olestra, cellulose gel, carrageenan, polydextrose, modified food starch, microparticulated egg white protein, guar gum, xanthan gum, whey protein concentrate, gelatin, pectin, konjac, transglutaminase, collagen, methylcellulose, alginate, agar, soy proteins and pea proteins.

In some embodiments, an edible binder may comprise a whey protein hydrogel, such as a hydrogel comprising alginate and whey protein; or gelatin, for example beef gelatin, alginate and whey protein. For example, 2% (w/v) whey protein, 2% (w/v) gelatin, and 1% (w/v) sodium alginate; or 2% (w/v) whey protein, 3% (w/v) gelatin, and 1% (w/v) sodium alginate. The binder may be applied in liquid form and then treated to generate cross links and form a hydrogel that binds the building blocks. For example, an alginate/whey protein binder may be cross-linked with cal-cium, for example 2% (w/v) calcium chloride.

Not all binders require crosslinking. Some binders serve their purpose in their native form (e.g. gelatin). Some binders can be heated to enhance their binding strength (e.g. egg white, konjac). Some binders can be cooled to enhance their binding strength (e.g. methylcellulose). Some binders can be dried to enhance their binding strength (e.g. starch). Some enzymatic binders require time for their enzymatic action to occur (e.g. transglutaminase). The choice, amount and concentration of binders used in the artificial meat product may be optimized to closely mimic muscle fibre separation upon mastication or heating, and to mimic dif-ferent types of meats. In preferred embodiments, binders comprise up to 30% (w/w) of the artificial meat product (e.g. one of <5%, <10%, <15%, <20%, <25% or <30%).

Figure 5:
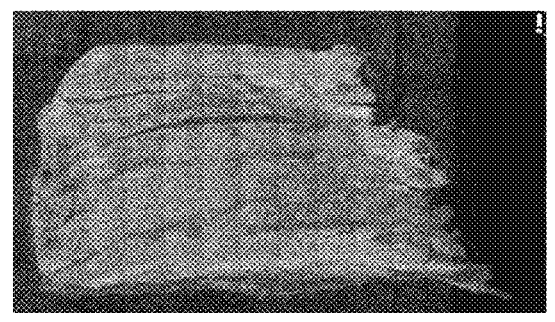
FIG. 5 shows tearing behaviour of micro-imprinted sheets (A) Micro-imprinted protein sheet before tearing and (B) after tearing. (C) Chicken sheet after tearing. (D) Non-imprinted protein sheet before tearing and (E) after tearing.
Figure 5:
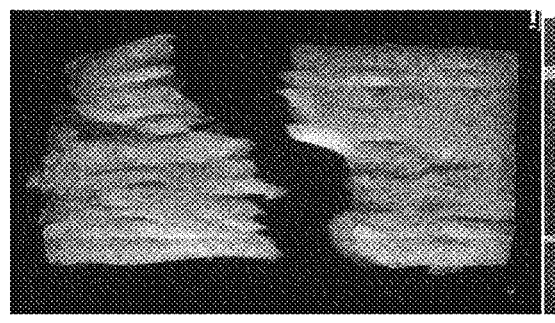
Figure 5:
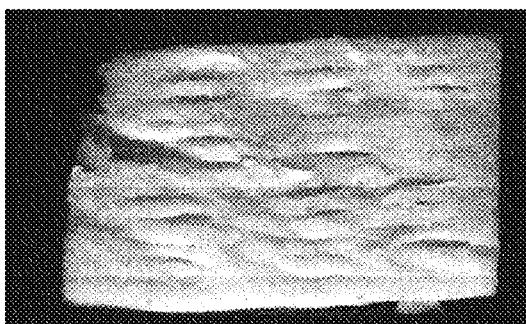
Figure 5:
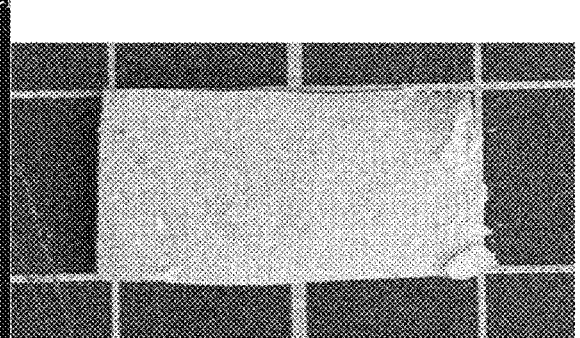
Figure 6:
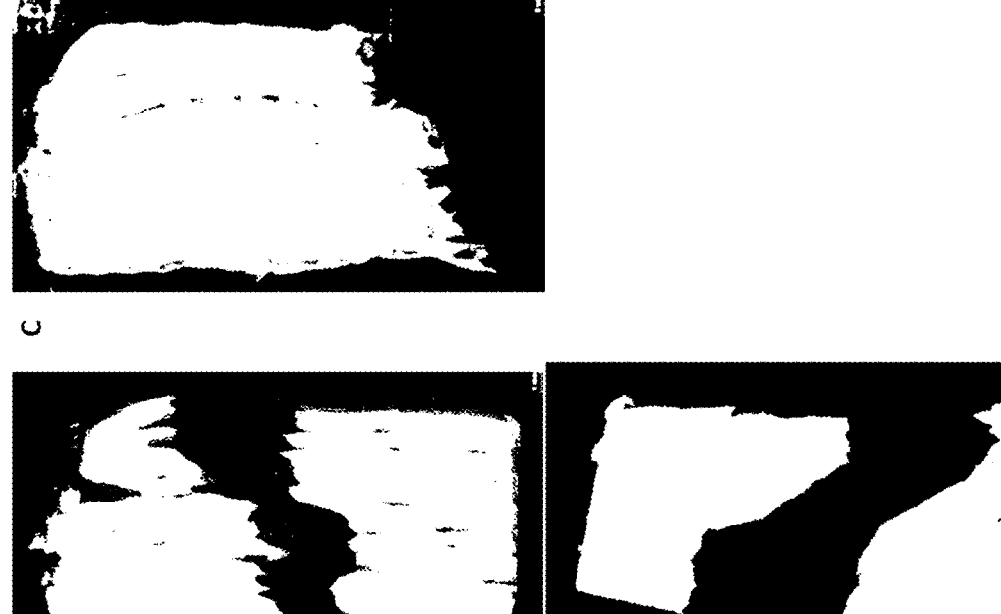
FIG. 6 shows the tearing behaviour of micro-imprinted sheets (Threshold view) (A) Micro-imprinted protein sheet before tearing and (B) after tearing. (C) Chicken sheet after tearing. (D) Non-imprinted protein sheet before tearing and (E) after tearing.
Figure 6:
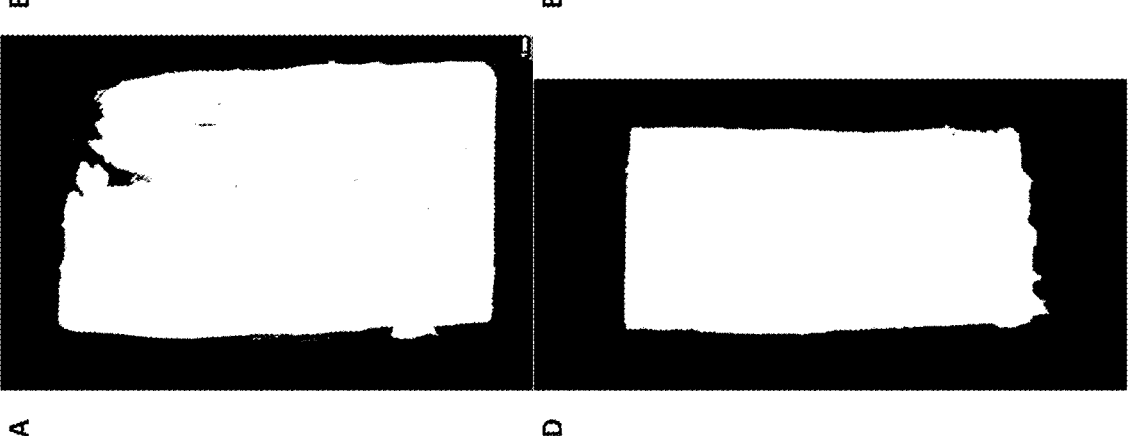

Evaluation of how closely a given artificial meat product mimics muscle fibre separation in a reference kind of meat may comprise visual inspection, e.g. after pulling meat analogues/meat apart along the grain of the tissue. FIGS. 5 and 6 of the present disclosure exemplify comparison of muscle fibre separation between a chicken meat analogue and chicken meat.

Alternatively, or in addition, analysis may comprise a controlled sensory evaluation.

The edible binder may further comprise oil and/or fat to provide marbling within the artificial meat product.

For example, the binder may be mixed with an oil, for example 10% (v/v) oil, such as sunflower oil. Suitable oils and fats are described below. In some embodiments, fats comprise up to 30% (w/w) of the artificial meat product (e.g. one of <5%, <10%, <15%, <20%, <25% or <30%).

An artificial or alternative meat product is a synthetic product that is made from meat derived from an animal carcass using conventional butchery processes. The artificial meat product may be for dietary consumption. The artificial meat product may be a cut meat product. A cut meat product is a meat product that includes intact muscle fibres, which separate upon cooking and mastication. Cut meat may be distinguished for example from minced meat, which lacks intact muscle fibres. Methods of the invention allow scalable and precise structuring at the micro-scale using microtech-nology (i.e. the creation of micro-metre scale structural features using precision equipment) followed by the con-struction of 3D whole meat cut structures using edible binders.

Assembly of building blocks into a meat product, as described herein leads to the formation of fibre-like struc-tures in the meat product that mimic muscle fibres (e.g. after mastication or physical separation). The fibre-like structures may be micro-scale structures (i.e. 1 to 1000 pm). These fibre-like structures in the meat product separate upon cooking and/or mastication of the product i.e., thermal or mechanical treatment of the product degrades the binder that holds the fibre-like structures together, causing them to separate from each other. This separation may contribute allows the artificial meat product to mimic the ATM of natural cut meat. For example, the artificial meat product may display or mimic the appearance, texture and mouthfeel (ATM) of natural cut meat, such as a cattle, pig, sheep, poultry, duck, deer, rabbit, fish or other seafood cut meat. Evaluation of appearance can be performed by visual inspection after pulling meat analogues/meat apart along the grain of the tissue. FIGS. 5 and 6 of the present disclosure exemplify analysis of appearance. Alternatively, or in addition, analysis may comprise a controlled sensory evaluation. Evaluation of texture can be analysed using a texture analyzer. It will be appreciated that in order to mimic a particular kind of meat, controlled fibre separation may be employed in the artificial meat product combination with cells of the relevant species, flavourings and/or colourings.

Fibre separation can be evaluated and quantified e.g. by visual inspection of roughness of the tearing edge. Greater roughness of the tearing edge is indicative of increased fibre separation.

In some methods described herein, the building blocks may be sheets of edible protein. Suitable sheets may have a thickness of 1 pm to 1000 pm. It will be appreciated that sheets may have a thickness mimicking muscle fibre dimensions. In preferred embodiments, sheets may have a thickness of 10-500 pm, e.g. 20-100 pm. The artificial meat product may be produced by layering or placing the sheets on top of each other to produce a pile or stack. The sheets may be bound together using edible binder. For example, a method of producing an artificial or alternative meat product may comprise; providing multiple sheets of edible protein, introducing grooves into the surfaces of the sheets, applying an edible binder to the grooved sheets and assembling the grooved sheets to form an artificial meat product.

Figures 2, 3:
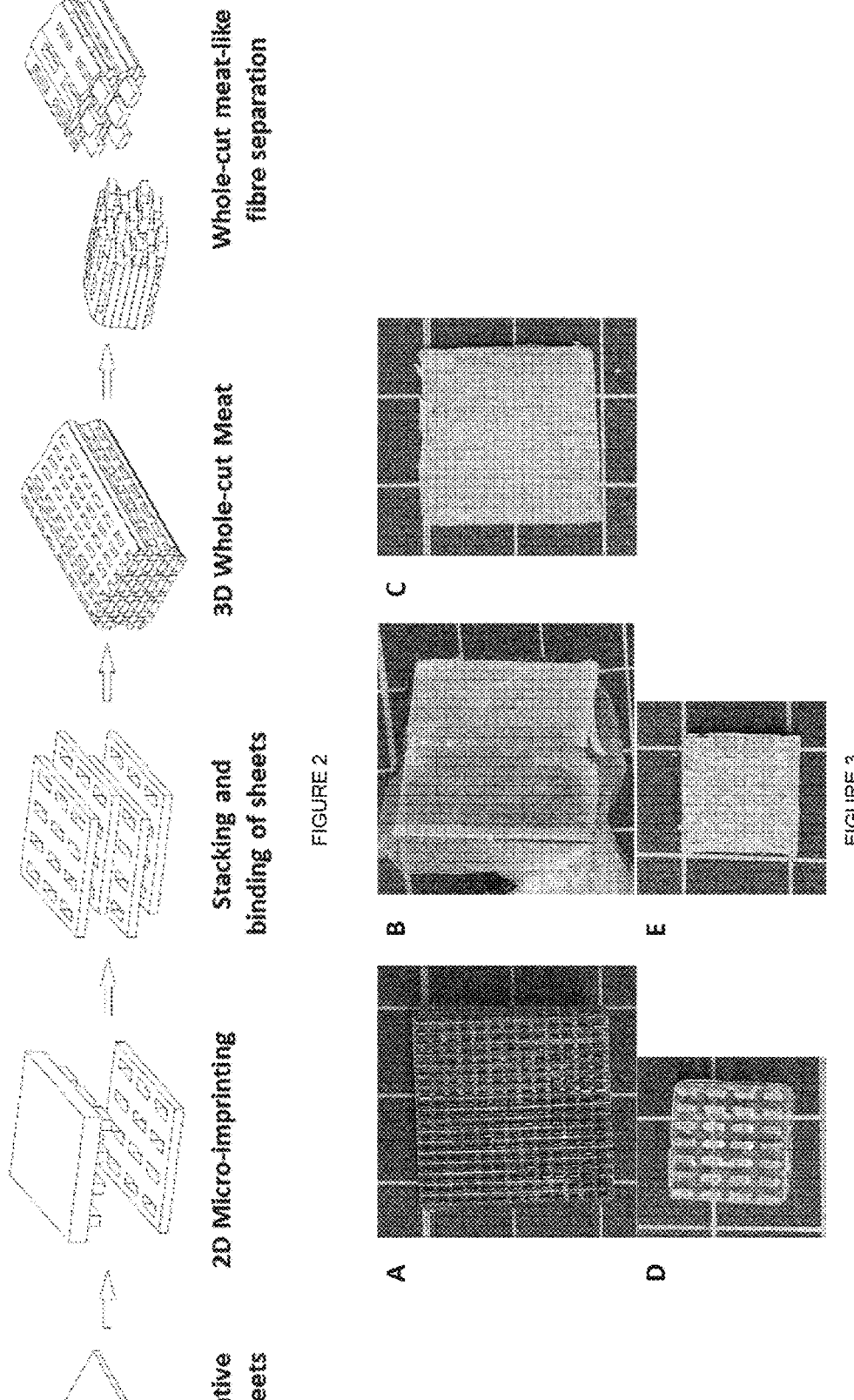
FIG. 2 shows the manufacturing of alternative meat cuts by micro-imprinting Two-dimensional alternative protein sheets are formed. Two-dimensional sheets are imprinted. To produce grooves. Imprinted sheets are then stacked in a controlled sequence and bound by food-grade binders to form a three-dimensional alternative whole meat cut. The resulting alternative whole meat cut recreates the appearance, texture, and mouthfeel (ATM) of meats including the separation of muscle fibre-like structures upon mastication.
FIG. 3 shows micro-imprinting moulds (A) Example of a large micro-imprinting mould. (B) Micro-imprinting on protein sheets. (C) Micro-imprinted protein sheet. (D) Example of a small micro-imprinting mould and (E) Small micro-imprinted protein sheet.

The grooved sheets may be assembled for example by piling, stacking or rolling, to produce an artificial meat product comprise multiple layers of grooved sheets. The grooved sheets may be bound together by the edible binder. In some embodiments, a single sheet is rolled. In some embodiments, a multi-layered construct (e.g. formed by piling/stacking multiple layers) is rolled. Rolled sheets/ layers may be subsequently bound. An example of a process for producing an artificial or alternative meat product is shown in FIG. 2.

In some embodiments, a method of producing an artificial or alternative meat product as described herein may comprise (i) providing a sheet of edible protein, (ii) introducing grooves onto the surface of the sheet, (iii) applying binder to a surface of the sheet to produce a binder coated surface, (iv) providing a further sheet of protein, (v) introducing grooves onto the surface of the further sheet, (vi) layering the further grooved sheet onto the binder coated surface, (vii) applying binder to a surface of the further sheet to produce a binder coated surface, and optionally repeating steps (iv) to (vii) to produce an artificial or alternative meat product comprising layers of sheets of edible protein.

Grooves are introduced into the surfaces of the sheets of edible proteins. The presence of the grooves on each sheet in the artificial meat product allows the product to mimic the tearing behaviour of natural meat.

Grooves may be indentations, recesses and/or cuts in the sheet. In some embodiments, combinations of indentations and cuts may be introduced into the surface of the sheets.

Figure 4:
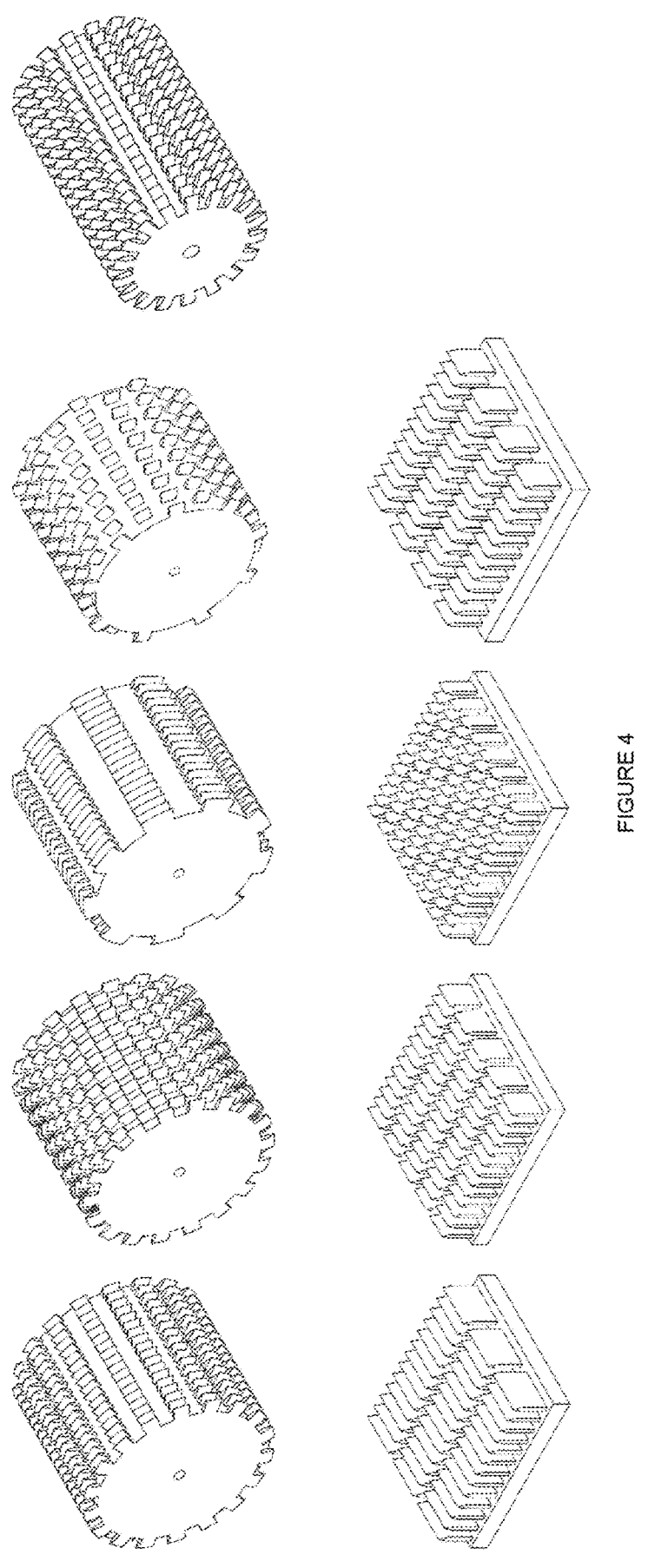
FIG. 4 shows examples of micro-imprinting patterns.

Suitable grooves may be 1 to 1000 pm in depth (i.e., the grooves may be micro-grooves). Grooves are preferably of a depth sufficient to fully puncture the sheet. It will be appreciated that grooves may be at least the same thickness of the sheet. Exemplary sizes and shapes of grooves are shown in FIG. 4. In some embodiments, a groove has a width and/or length of 1 pm to 1000 pm.

The grooves may be distributed in the sheet to form a pattern or arrangement. For example, multiple sets or series of grooves may be introduced into the surface of a sheet. Each set or series of grooves may consist of multiple indentations, recesses and/or cuts and the set or series may extend across a dimension of the sheet. Each set or series of grooves may be linear. The sets or series of grooves on the sheet may be parallel or substantially parallel to each other. The grooves may be provided in any pattern suitable for generating the fibre structure. In some embodiments, multiple grooves may be provided as parallel lines. In some embodiments, grooves may be provided in parallel, but staggered.

Preferably, the grooves in the sheet are not continuous parallel cuts. The pattern of grooves in the sheets may be tailored to mimic the properties of different types of meat. For example, the number of indentations and/or cuts, and their depth, size, shape, distance and relative position may be altered depending on the type of artificial meat product.

It will be appreciated that the distance between the grooves of a sheet determines the width of the fibres generated following fibre separation. Increasing the distance between grooves results in fibres having a larger width during mastication, resulting e.g. in a more pork- or beef-like mouthfeel. Reducing the distance between grooves result in fibres having a smaller width, resulting e.g. in a more chicken- or fish-like mouthfeel. In some embodiments, the distance between grooves is ~20 to 80 pm. In some embodiments, the distance between grooves is ~50 to 60 pm. In some embodiments, the distance between grooves is ~30 to 50 pm. The patterning and distance between grooves may be selected to mimic a given type of meat.

The patterns or arrangements of grooves in the sheets form linear fibre-like structures in the artificial meat product. The fibre-like structures may separate on cooking or mastication, thereby mimicking the ATM of a natural meat cut. The patterns or arrangements of grooves may be customized or optimized to tailor the meat-like separation of the fibre-like structures in the artificial meat product to mimic a specific type of meat. For example, the meat-like separation of the fibre-like structures may be tailored to mimic cut meat from a source organism such as cattle, pig, sheep, poultry, duck, deer, rabbit, fish or other seafood. Suitable source organisms may include livestock species, such as cow, buffalo, sheep, goat, pig, camel, rabbit, deer, and the like; poultry species, such as chicken, goose, turkey, pheasant, duck, ostrich, and the like; and/or aquatic or semi-aquatic species, such as fish, molluscs (for example, abalone, clam, conch, mussel, oyster, scallop, and snail), cephalopods (for example, cuttlefish, octopus, and squid), crustaceans (namely, crab, crayfish, lobster, prawn, and shrimp), cetaceans, frog, turtles, crocodiles, and the like.

Grooves may be introduced in the surface of the sheets using any convenient technique. In some embodiments, the grooves may be introduced into the sheets by cutting. For example, a method may comprise applying a cutter to the sheet to introduce one or more grooves into the surface of the sheet. Suitable cutters are available in the art. In other embodiments, the grooves may be introduced into the sheets by imprinting. For example, a method may comprise applying an imprinting mould or an imprinting roller to the sheet to introduce one or more grooves into the surface of the sheet. Suitable moulds and rollers are available in the art. Examples of imprinting moulds are shown in FIG. 3. Examples of imprinting devices and patterns or arrangements of grooves are shown in FIG. 4.

In some embodiments, a method described herein may comprise producing sheets of edible protein. The sheets may be formed by any convenient technique, such as extrusion, casting, moulding, or calendaring. For example, the sheets may be formed by high moisture extrusion, extrusion calendaring, flat film extrusion, shear cell technology, solvent casting, or compression moulding. In some embodiments, sheets may be produced by blending an edible protein, for example a plant protein, such as pea protein, and optionally wheat gluten and extruding under high moisture extrusion to form a protein block. The protein block may then be sliced into sheets with a meat slicer.

The sheets may be assembled into a stack, for example by positioning or layering the sheets on top of one another. The sheets may be assembled in a controlled sequence. For example, grooved sheets may be added sequentially to the top or bottom of a nascent stack of grooved sheets. Each grooved sheet may be bound with edible binder to the surface of the previous sheet. The stacking of grooved sheets generates fibre-like structures in the artificial meat product, as described above.

Preferably, the sheets are staggered in the stack i.e., the sheets are positioned such that the grooves in each sheet in the stack are not located in the same positions as the grooves in the sheets directly above and below. In some embodiments, the pattern or arrangement of grooves in the sheets may comprise multiple linear series or sets of grooves. The series or sets of grooves in adjacent sheets of the stack may be parallel or substantially to each other but are preferably not in the same positions in the adjacent sheets. The staggered of the sheets in the stack may lead to irregular breaks in the artificial meat product during cooking and/or mastication. These irregular breaks may mimic natural meat. The relative positions of the sheets in the stack may be customized or optimized to generate separation of fibre-like structures with the artificial meat product that mimics a specific type of cut meat.

In some embodiments, a method described herein may comprise rolling up one or more sheets or stacks of sheets to form rods mimicking certain shapes of meat. In some embodiments, a binder may be applied to one side of single sheet, or to one side of a stack of sheets, and the sheet(s) may then be rolled. Such methods are particularly suited to the production of smaller, e.g. bite-sized artificial meat products.

Methods described herein may be performed in a continuous process. For example, artificial meat products, such as cut meat products, may be produced continuously by forming sheets of edible protein, introducing grooves into the surfaces of the sheets, applying an edible binder to the grooved sheets and assembling the grooved sheets into artificial meat products as described herein.

Also provided is equipment for use in the production of artificial meat products as described herein. An artificial meat production device or apparatus may comprise;

(i) a surface modifying element to imprint or cut grooves into a surface of a sheet of protein, (ii) a binder dispenser to apply binder to the grooved sheets, and (iii) an assembler to stack the grooved sheets with applied binder to produce the alternative meat product.

Suitable surface modifying elements include cutters, imprinting moulds, imprinting rollers and/or lasers. The surface modifying element may be adapted to imprint an arrangement or pattern of grooves that mimics a type of cut meat. In some embodiments, the surface modifying element may be programmable. For example, the surface modifying element may be capable of applying different patterns of grooves to sheets of edible protein to mimic different types of cut meat.

Suitable binder dispensers include sprayers, brushes, extruders, and binder baths.

Suitable assemblers include layering systems for stacking sheets of edible protein, for example using rollers, moving belts, or robotic parts.

Optionally, a device or apparatus may further comprise a cutter to form artificial meat products of the desired shape and size. Such devices are well known in the art, and included e.g. rotary cutters.

In some embodiments, the device or apparatus may be adapted to provide continuous production of artificial meat products. For example, the device or apparatus may further comprise a sheet forming element for producing sheets of edible protein. Suitable sheet forming elements include high moisture extruder, extrusion calendar machine, flat film extruder, shear cell device, solvent casting device, or compression moulding device The device or apparatus may further comprise one or more belts or other conveyors to transport the sheets, grooved sheets or nascent stack of grooved sheets between the elements of the apparatus or device. For example, the device or apparatus may further comprise a belt or other conveyor to transport the sheets between the sheet forming element and the surface modifying element. The device or apparatus may further comprise a belt or other conveyor to transport the sheets between the surface modifying element and the binder dispenser.

Figure 9:
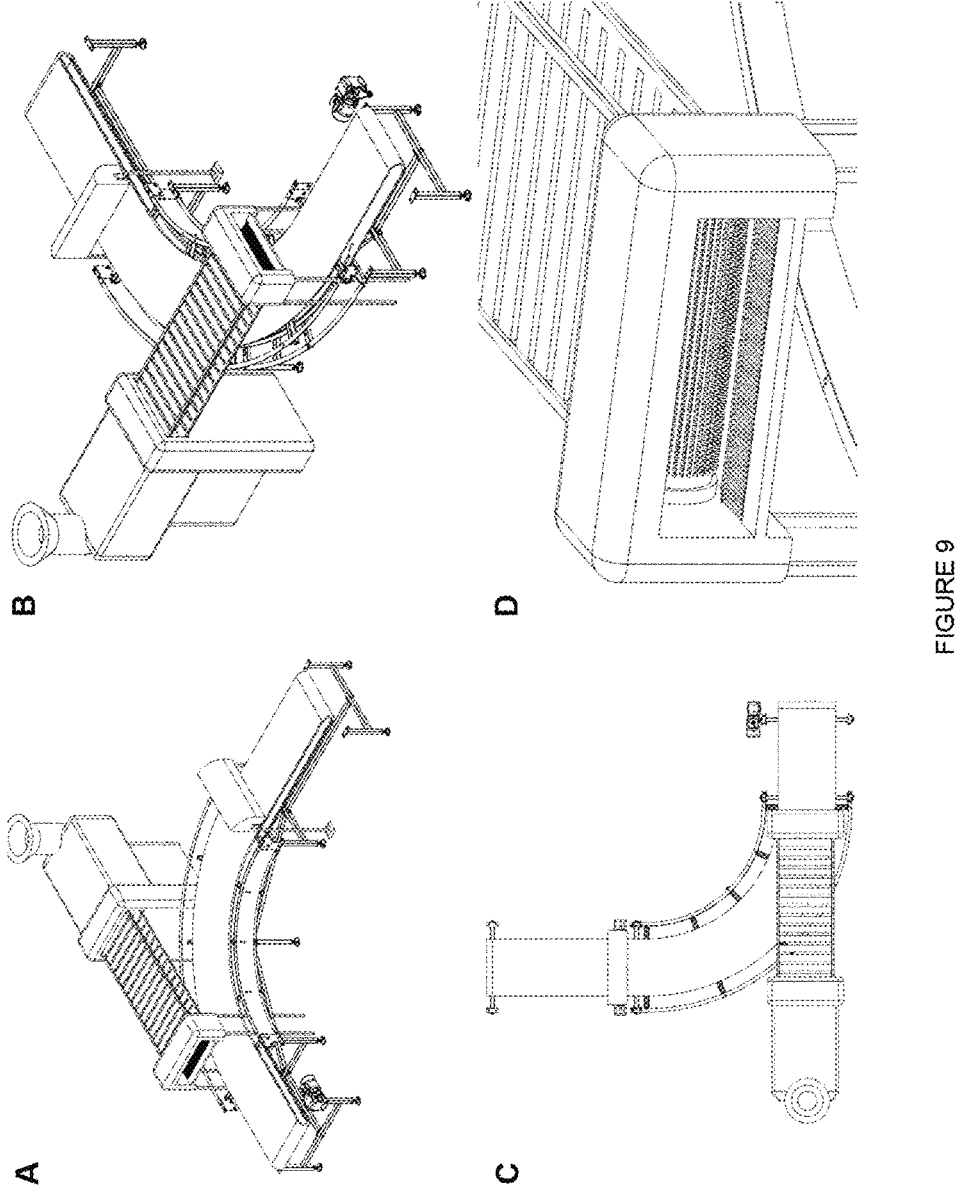
FIG. 9 shows continuous manufacturing process and equipment for alternative meat cuts by microimprinting. (A) Diagram of an example of the processing equipment for continuous manufacturing. (B) Side-view of a possible processing equipment (C) Top-view of a possible processing equipment. (D) Close-up of an example of a continuous micro-imprinting device.

Examples of suitable apparatus for continuous production of artificial or alternative meat products are shown in FIG. 9.

In some embodiments, the device or apparatus may further comprise multiple sets of elements as described above to produce an artificial meat product comprising multiple layers of sheets. In other embodiments, the sheets may be cycled through a single set of elements as described above multiple times to produce a meat product comprising multiple layers of sheets.

Figure 10:
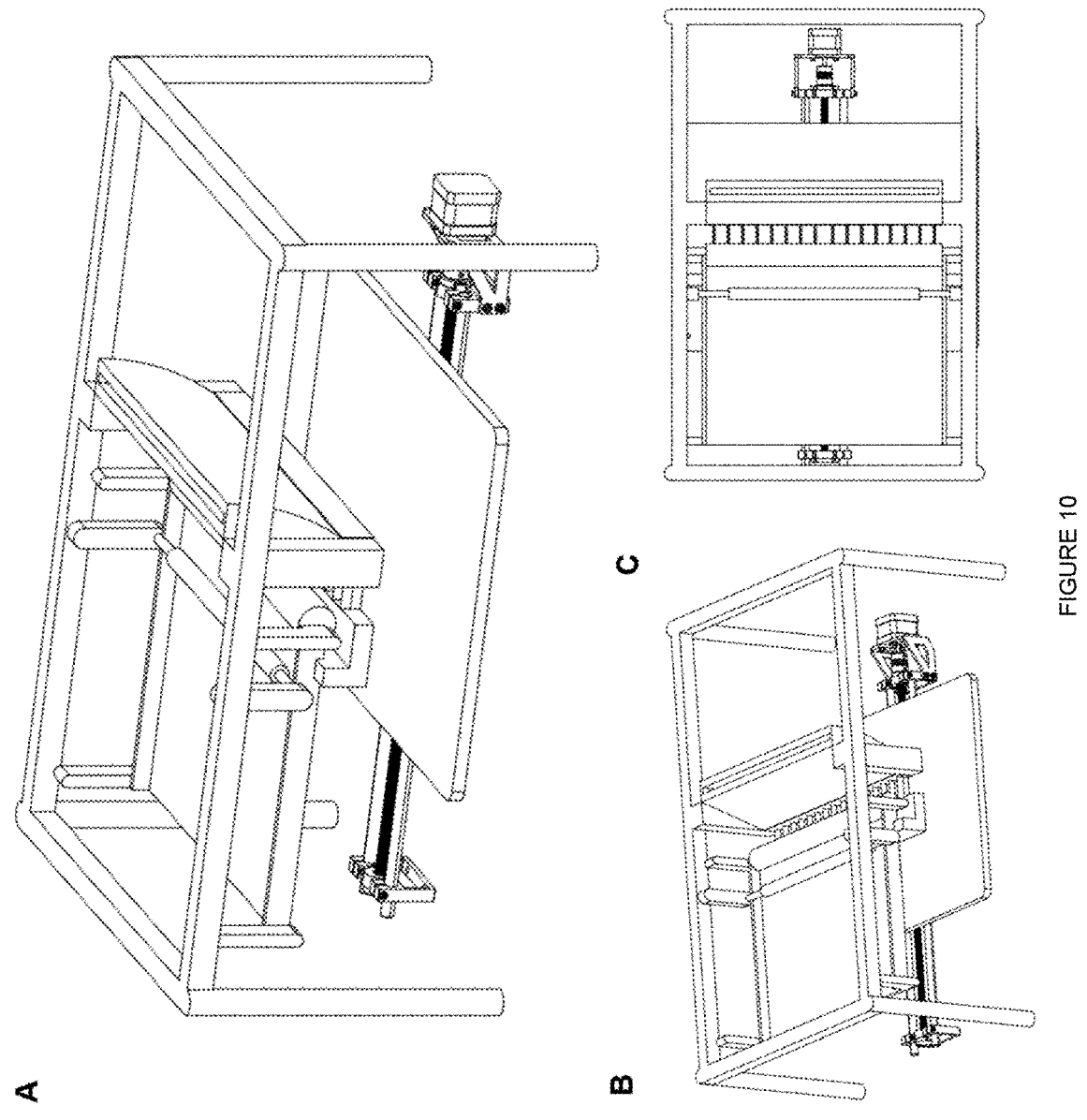
FIG. 10 shows an example of a small-scale manufacturing process and equipment for alternative meat cuts by micro-imprinting. (A) Diagram of a possible processing equipment for small-scale manufacturing. (B) Side-view of a possible processing equipment (C) Top-view of a possible processing equipment.

In other embodiments, the device or apparatus may be adapted for batch or non-continuous production of artificial meat products. For example, the device or apparatus may further comprise a sheet loading tray for loading pre-formed sheets of edible protein into the device or apparatus. The device or apparatus may comprise a conveyor to move the sheets, grooved sheets or nascent stack of grooved sheets between the elements of the apparatus or device. Examples of suitable apparatus for batch production of artificial or alternative meat products are shown in FIG. 10.

In other embodiments, the building blocks may be filaments, fibrils, or fibres of edible protein. Fibrils may have a 1 to 1000 μm diameter, preferably 10 to 500 μm diameter. Fibres may have a 1 to 10 mm diameter.

The artificial meat product may be produced by combining the filaments, fibrils, or fibres with edible binders. For example, a method of producing an artificial or alternative meat product may comprise; producing multiple fibrils of edible protein, combining the fibrils with a first binder to form fibres, combining the fibres with a second binder to produce an artificial meat product.

Multiple fibrils may be bound together with the first binder to produce each fibre. The fibrils may be aligned or parallel within the fibre. Multiple fibres may be bound together with the second binder to produce the artificial meat product. The fibres may be aligned or parallel in the artificial meat product.

The first binder may be more stable than the second binder. For example, the first binder may be more thermostable and/or mechanostable than the second binder i.e., it may be more resistant to thermal stress, such as stress induced by cooking, and/or mechanical stress, such as stress induced by mastication. Mechanostability can be evaluated e.g. by lap joint shear strength test, following application of binders to bind fibres. Thermostability can be evaluated e.g. by heating bound fibres (e.g. in a water bath), and observing the extent of fibre separation after a given period of time.

The stability of a given binder can be modified e.g. by varying the amount and/or concentration of the binder. Where an enzymatic binder is used (e.g. transglutaminase), stability can be modified by varying the duration of enzymatic action. Where cross-linkable binders are used, stability can be modified by varying the kind, amount and/or concentration of crosslinker.

Stability of binders may be modified in order to mimic the change in texture and/or mouthfeel of meat after cooking. Texture analysis can be performed before and after heating of meat and meat analogues to determine the change in textures. The mouthfeel can be analysed by sensory evaluation, comparing the meat and meat analogue. Texture and/or mouthfeel is deemed to closely mimic that of natural meat when little or no difference is observed between the texture/mouthfeel of the meat analogue and natural meat.

This causes the fibres within the meat product to separate from each other on cooking or mastication more readily that the fibrils within the fibres. This may be useful in improving the ATM of the artificial meat product.

Figure 11:
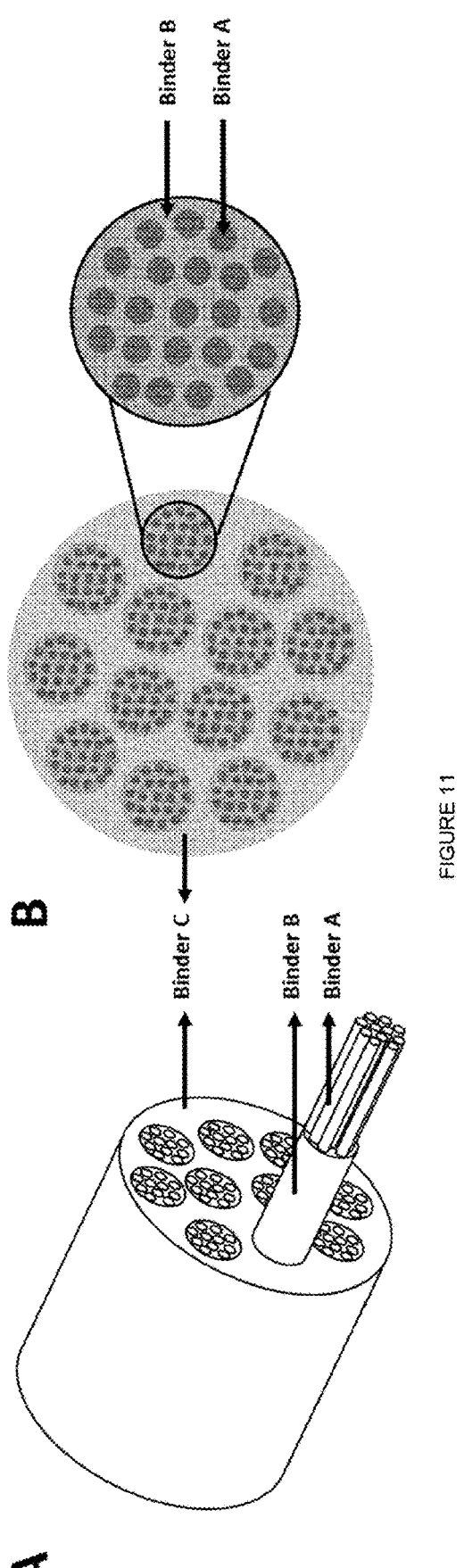
FIG. 11 shows multi-scale engineered CMC model to recapitulate mouthfeel of muscle meat cuts. Microsized fibres formed from a Binder A is bound together by a Binder B to form bundles of milli-sized fibres. Milli-sized fibres are bound by a Binder C. Binder A is more stable than Binder B, which is more stable than Binder C. (A) 3D model of the multi-structural model (B) Cross section of the multi-structural model consisting of micro-sized fibres.
Figure 12:
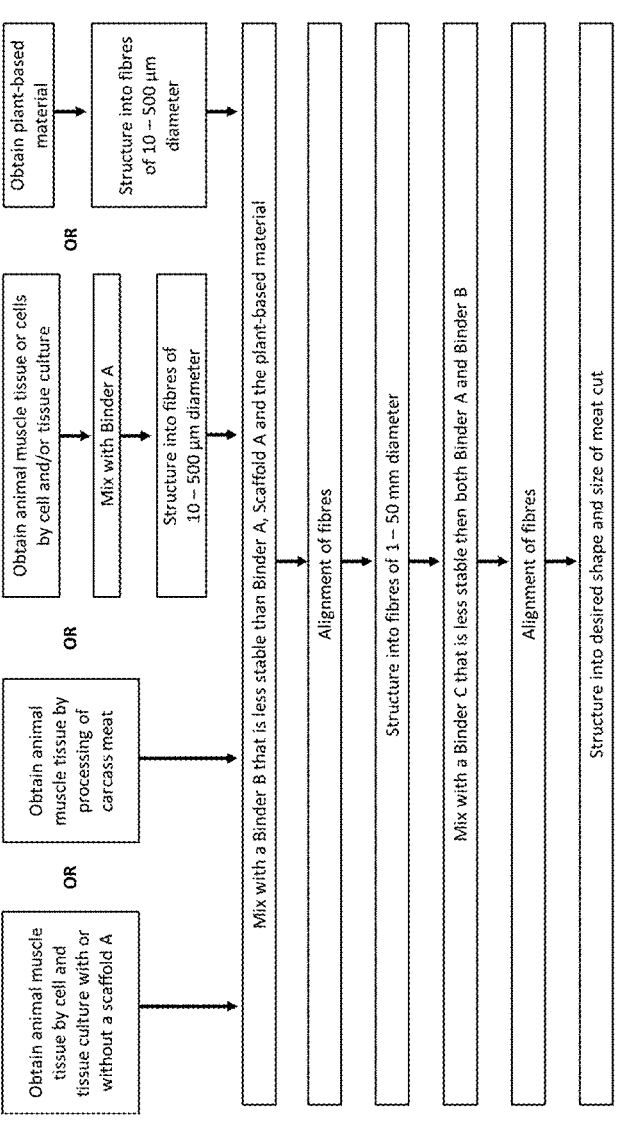
FIG. 12 shows the process flow of making the multi-scale engineered CMC model.

Suitable arrangements of fibrils and fibres are shown in FIG. 11. An example process for production of artificial or alternative meat products is shown in FIG. 12.

In some embodiments, the fibrils of edible protein may be produced by combining filaments of edible protein with a third binder. The filaments may, for example comprise animal muscle tissue or cells produced by cell or tissue culture. The filaments may be formed of pieces of tissue or cells in a binder, spun into a fibre. The third binder may be more stable than the first binder. For example, the third binder may be more thermostable and/or mechanostable than the first binder. In some embodiments, fibrils may be prepared by mixing a slurry of whey protein and alginate, for example 2% (w/v) whey protein and 2% (w/v) sodium alginate, in deionized water and extruding with a nozzle, for example a 100 μm diameter nozzle, into a crosslinker bath, for example 2% (w/v) calcium chloride bath, to form wet spun fibres. Fibres can be generated by additive manufacturing, moulding, forming, wet spinning, dry spinning, high moisture extrusion, hot extrusion, cold extrusion, warm extrusion, micro extrusion, high pressure extrusion.

In other embodiments, the fibrils of edible protein may be obtained from animal muscle tissue produced by cell or tissue culture. Optionally, the animal muscle tissue may be cultured in a scaffold. The scaffold may be more stable than the first binder. For example, the scaffold may be more thermostable and/or mechanostable than the first binder. Fibrils can be formed by culturing cells in biocompatible hydrogels formed into fibres, e.g. by ionic crosslinking, complex coacervation, 3D printing, wet spinning, etc. Biocompatible hydrogels include e.g. alginate and chitosan.

In other embodiments, the fibrils of edible protein may be obtained from animal muscle tissue produced by processing of carcass meat, preferably post-rigor carcass meat. Such methods include e.g. cutting, shredding or enzymatic digestion of animal tissue.

In other embodiments, the fibrils of edible protein may be obtained from plant material. The plant material may be shaped into fibrils for use in the methods described herein. Such methods include e.g. cutting, shredding or enzymatic digestion of plant material.

Figure 17:
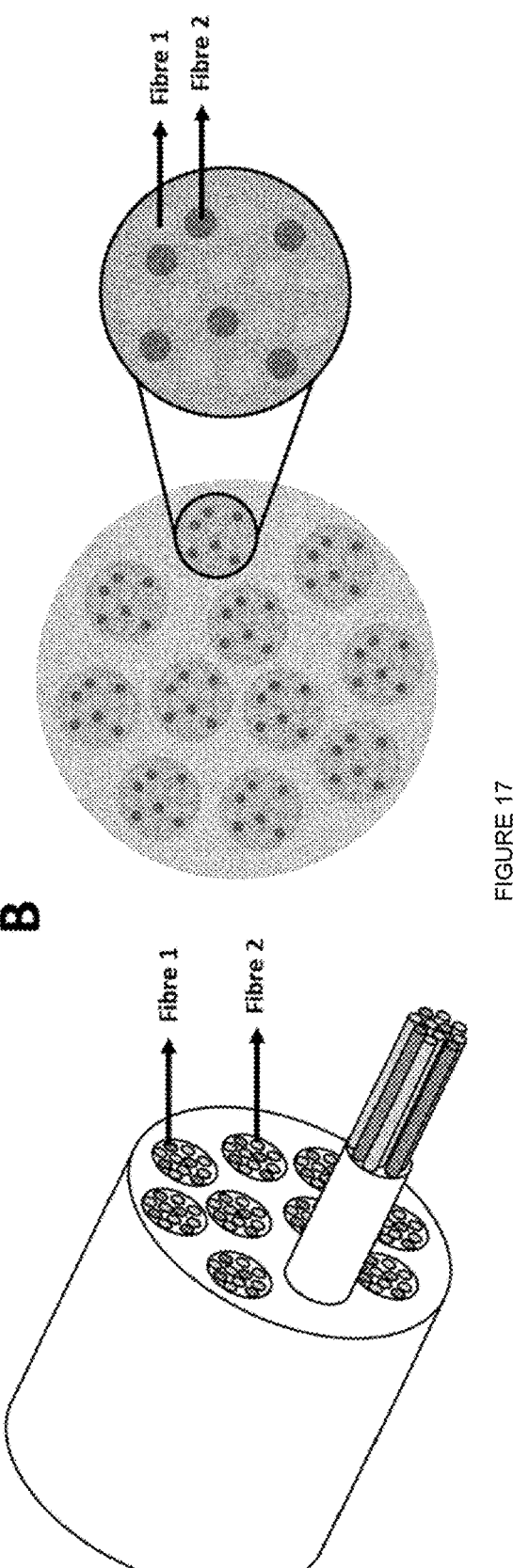
FIG. 17. Mixing plant fibres with pork muscle fibres enable blended meat cuts (A) 3D model of the blended meat cut model. (B) Cross section of the blended meat cut model (C) Prototype of cooked and uncooked blended meat cuts with clear separation of fibres after cooking (D) Process flow of making the blended meat cut.
Figure 17:
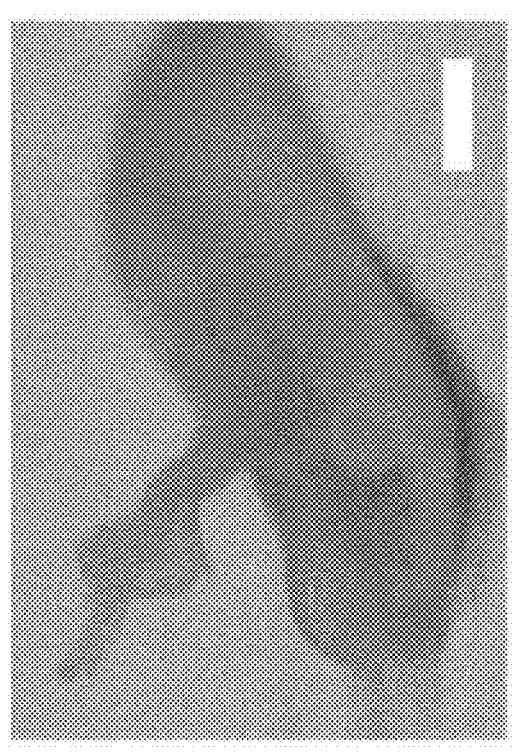
Figure 17:
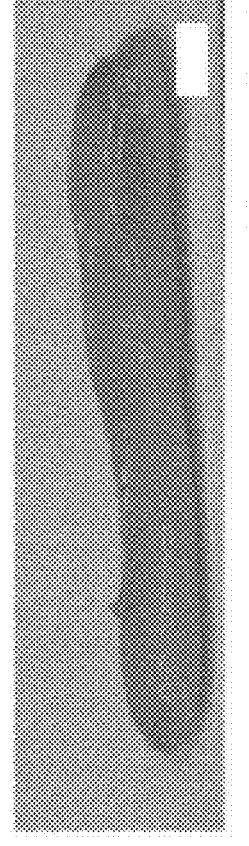
Figure 17:
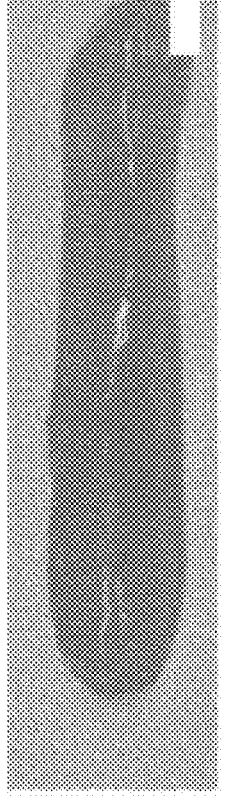
Figure 17:
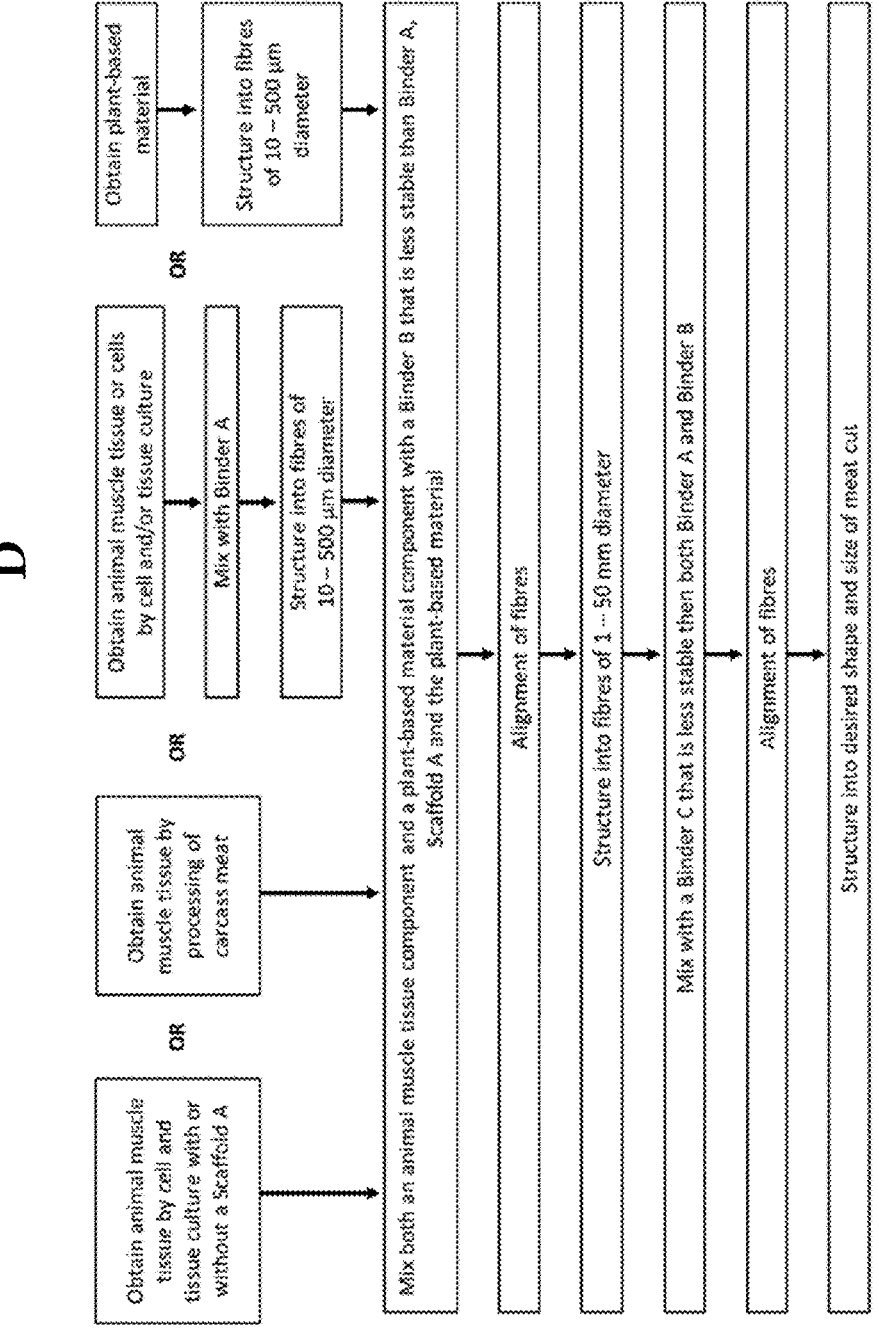

In other embodiments, the fibrils of edible protein may be obtained from multiple sources. For example, the fibrils may include fibrils obtained from plant material and fibrils obtained from animal muscle tissue. Suitable arrangements of fibres are shown in FIGS. 17A and 17B. An example process for production of artificial or alternative meat products is shown in FIG. 17C

In some embodiments, the fibrils of edible protein may be mixed with the first binder, for example a solution of whey protein, gelatine and alginate, for example 2% (w/v) whey protein, 3% (w/v) beef gelatine and 1% (w/v) sodium alginate in deionized water. Other suitable agents to be employed as a first binder include e.g. olestra, cellulose gel, carrageenan, polydextrose, modified food starch, microparticulated egg white protein, guar gum, xanthan gum, whey protein concentrate, gelatin, pectin, konjac, transglutaminase, collagen, methylcellulose, alginate, agar, soy proteins and pea proteins. The fibres may be aligned within the binder by hand and the binder then crosslinked in a cross-liker bath, such as a 2% (w/v) calcium chloride bath to form bundles of about 30 fibrils. In some embodiments, the first binder may be mixed with oil, for example sunflower oil for example at a concentration of 10% (v/v) and stirred until emulsified to form the marbled meat structure.

In other methods described herein, fibres of edible protein may be directly assembled into an artificial meat product. For example, a method of producing an artificial or alternative meat product may comprise; producing multiple fibres of edible protein, and combining the fibres with a first binder to produce a meat product.

Suitable fibres may be 10 um to 50 mm diameter.

In some embodiments, the fibres may be produced by combining fibrils of edible protein with a second binder. The fibrils may be animal muscle tissue or cells produced by cell or tissue culture. The second binder may be more stable than the first binder. For example, the second binder may be more thermostable and/or mechanostable than the first binder In other embodiments, the fibres of edible protein may be obtained from animal muscle tissue produced by cell or tissue culture. The animal muscle tissue may be cultured in a scaffold. The scaffold may be more stable than the first binder. For example, the scaffold may be more thermostable and/or mechanostable than the first binder.

In other embodiments, the fibres of edible protein may be obtained from animal muscle tissue produced by processing of carcass meat, preferably post-rigor carcass meat.

In other embodiments, the fibres of edible protein may be obtained from plant material. For example, a method may comprise shaping plant material into fibres. Multiple fibres may be bound together with the first binder to produce the meat product. The fibres may be parallel in the meat product.

Suitable arrangements of fibres are shown in FIG. 14A. An example process for production of artificial or alternative meat products is shown in FIG. 14C.

Oil and/or fat may be used to provide marbling within the artificial meat product and/or to improve the taste or texture of the artificial meat product.

In some embodiments, a building block, such as a sheet or fibre, or an edible binder, such as the first, second or third binder described above may comprise oil and/or fat. In other embodiments, oil and/or fat may be a separate component of the artificial meat product.

The fat may be an edible fat. Suitable fats include a non-animal fat, an animal fat, or a mixture of non-animal and animal fat. For example, the edible fat may be a plant fat, such as a vegetable fat. Suitable fats include fats that are solid at room temperature (~20° C.). Typically, fats that are solid at room temperature are composed of high amounts of saturated fatty acids. Fats may include margarine and butters, such as shea butter, mango butter or cocoa butter.

Suitable fats also include fats that are liquid at room temperature (~20° C.). A fat that is liquid at room temperature may be called an "oil". Typically, fats that are liquid at room temperature are composed of mainly unsaturated fatty acids and are commonly referred to as oils. Suitable oils include an algal oil, a fungal oil, corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, wheat germ oil, borage oil, black currant oil, sea-buckhorn oil, macadamia oil, saw palmetto oil, conjugated linoleic oil, arachidonic acid enriched oil, docosahexaenoic acid (DHA) enriched oil, eicosapentaenoic acid (EPA) enriched oil, palm stearic acid, sea-buckhorn berry oil, macadamia oil, saw palmetto oil, or rice bran oil; or other hydrogenated fats.

The fatty acid components of the fat may undergo lipid oxidation and react with Maillard reaction intermediates generated from the edible protein to enhance the flavour and aroma of the artificial meat product and improve its ATM.

For example, an artificial meat product as described herein may be additionally combined with an emulsified fat gel, for example a fat gel prepared by mixing sunflower oil at a concentration of 10% (v/v) with 2% (w/v) of beef gelatine and 1% (w/v) of sodium alginate and stirred until emulsified, then chilled to solidify. The solid emulsified fat gel may then be cut and combined with the artificial meat product and crosslinked, for example in 2% (w/v) calcium chloride, to form a fatty artificial meat product.

Figure 15:
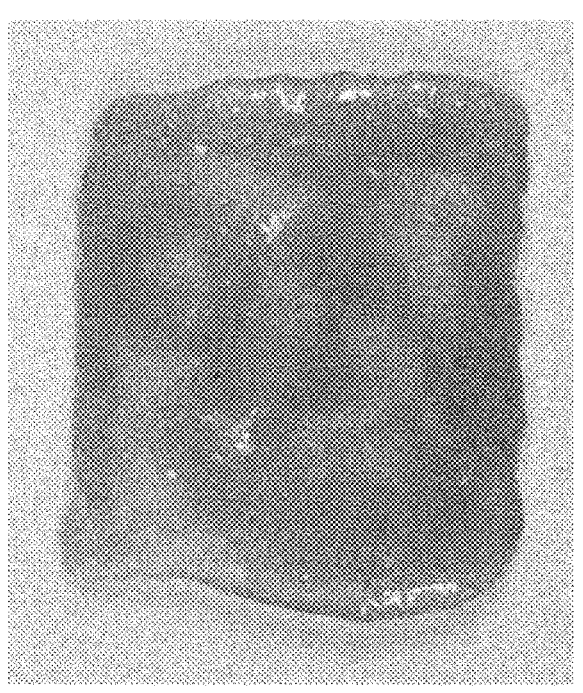
FIG. 15 shows that the incorporation of fat within the multi-scale engineered CMC model creates marbled meat. (A) 3D model of the multi-scale engineered CMC. (B) Prototype of uncooked marbled structure. (C) Process flow of making the marbled structure.
Figure 15:
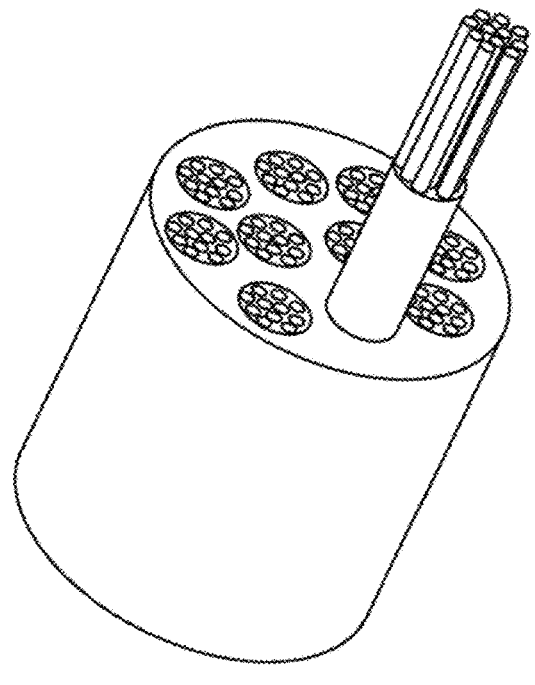
Figure 15:
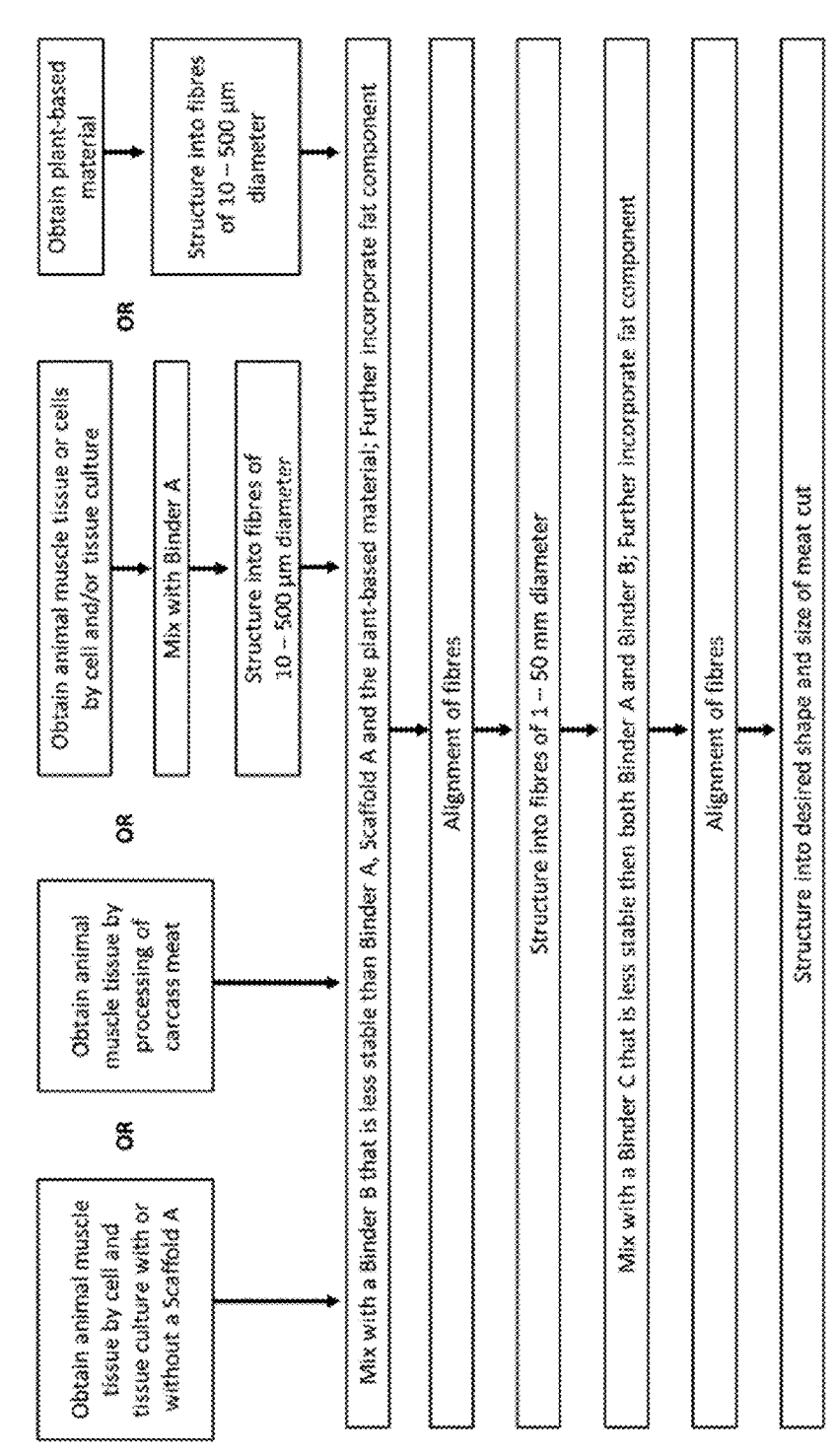
Figure 16:
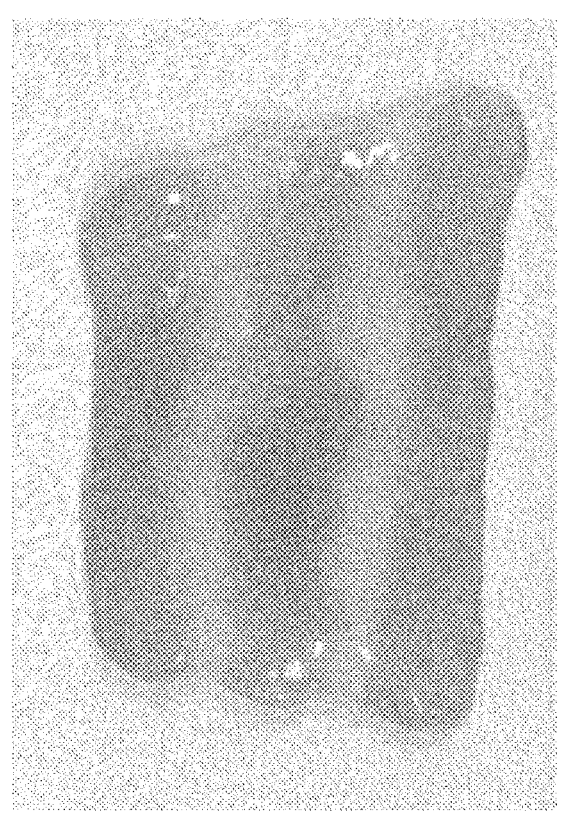
FIG. 16 shows that combining fat with the multi-scale engineered CMC model creates fatty meats. (A) 3D model of the fatty meat model. (B) Prototype of uncooked fatty meat structure. (C) Process flow of making the fatty meat structure.
Figure 16:
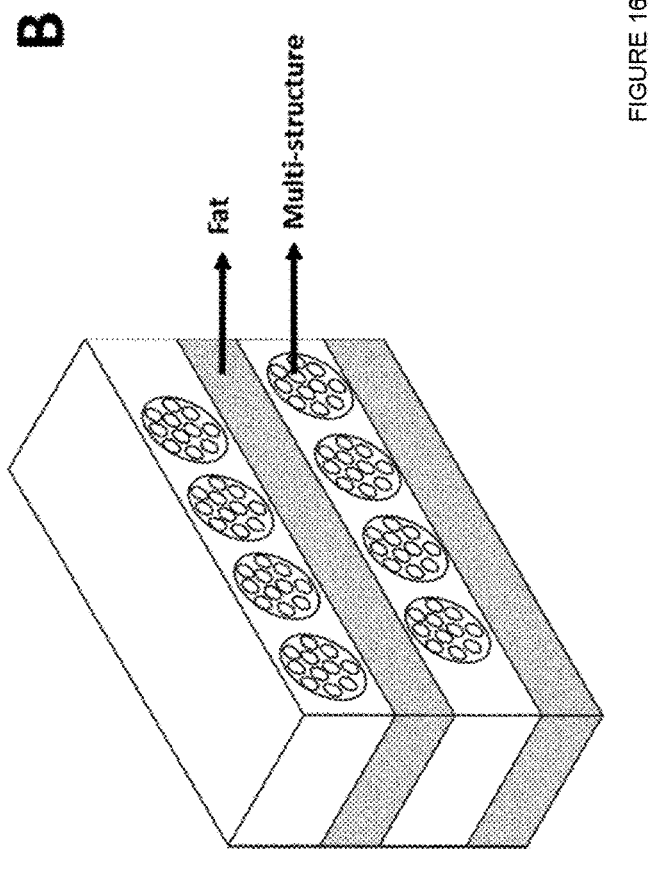
Figure 16:
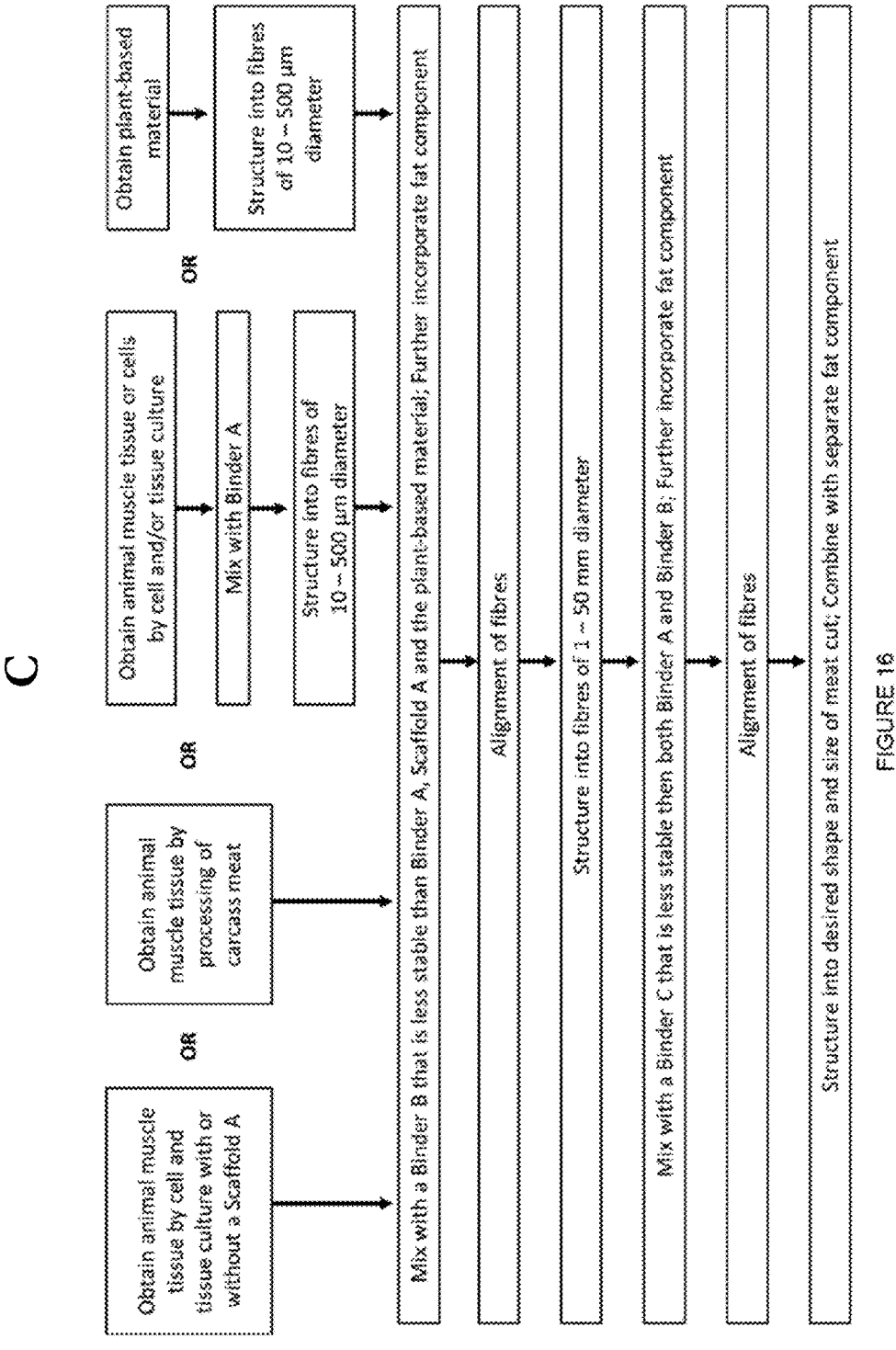

The incorporation of fat into one or more edible binders in the artificial meat product is shown in FIGS. 15A and 15B. An example process for production of artificial or alternative meat products with incorporated fat is shown in FIG. 15C. The incorporation of fat into the artificial meat product to simulate intermuscular fat is shown in FIGS. 16A and 16B. An example process for production of artificial or alternative meat products with incorporated intermuscular fat is shown in FIG. 16C Also provided are artificial meat products comprising building blocks of edible protein and an edible binder. Suitable artificial meat products may be produced by a method described herein.

In some embodiments, an artificial meat product may comprise a stack of sheets of edible protein, each sheet in the stack having a grooved surface, the sheets being bound together with an edible binder. Suitable methods for producing an artificial meat product using sheets of edible protein as building blocks are described above. Advantageously, the artificial meat products of the present disclosure more closely mimic the structure of whole meat cuts, as opposed to minced meat.

In other embodiments, an artificial meat product may comprise a set of fibres bound together with a second edible binder, each fibre comprising multiple fibrils of edible protein bound together with a first edible binder. Suitable methods for producing an artificial meat product using fibrils and fibres of edible protein as building blocks are described above.

An artificial meat product as described herein may be a cut meat product. The artificial meat product may mimic the appearance, texture and mouthfeel (ATM) of natural cut meat. For example, the artificial meat product may mimic the ATM of a meat cut from a source organism selected from a livestock species (such as cow, buffalo, sheep, goat, pig, camel, rabbit, deer, and the like), poultry species (such as chicken, goose, turkey, pheasant, duck, ostrich, and the like), and/or aquatic or semi-aquatic species (such as fish, molluscs (namely, abalone, clam, conch, mussel, oyster, scallop, and snail), cephalopods (namely, cuttlefish, octopus, and squid), crustaceans (namely, crab, crayfish, lobster, prawn, and shrimp), cetaceans, frog, turtles, crocodiles Other aspects and embodiments of the invention provide the aspects and embodiments described above with the term "comprising" replaced by the term "consisting of and the aspects and embodiments described above with the term "comprising" replaced by the term "consisting essentially of.

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

Modifications of the above embodiments, further embodiments and modifications thereof will be apparent to the skilled person on reading this disclosure, and as such, these are within the scope of the present invention.

All documents and sequence database entries mentioned in this specification are incorporated herein by reference in their entirety for all purposes. "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

EXAMPLES

To achieve both precision and scalability, we have developed methods of structuring alternative proteins to produce whole meat cuts by protein building block engineering using microtechnology, followed by binding of building blocks to form a whole meat cut. Microtechnology enables scalable production of protein building blocks with precise microstructures, which can be bound by binders to produce alternative whole meat cuts with the ATM of meats including the separation of muscle fibre-like structures upon mastication, a key feature of whole meat cuts.

In a first approach, two-dimensional protein sheets were micro-imprinted with precise patterns of microgrooves and subsequently bound with edible binders. Two-dimensional alternative protein sheets were formed from plant-based and/or cell-based proteins by extrusion, casting, moulding, or calendaring. Two-dimensional sheets were imprinted and/or cut by imprinting moulds or cutters to produce precision patterns of grooves. Imprinted sheets were then stacked in a controlled sequence and bound by food-grade binders to form a three-dimensional alternative whole meat cut. Microimprinting of two-dimensional sheets allows the use of scalable and precise imprinting technology while the binder allows reconstruction of 2D sheets into sizable 3D whole-cut meat structures, recreating the ATM of whole meat cuts in a scalable manner.

In a second approach, building blocks of fibres at the micrometre-scale were prepared in a scalable manner, and subsequently combined with one edible binder to form millimetre-scale fibres, which were combined with another edible binder to form a whole meat cut. The edible binders were different stabilities, which degrade at different rates when subjected to heat and mechanical treatment. This allows sequential separation of fibres at different scales, starting from the macro-scale to the milli-scale and finally to the micro-scale, mimicking the behaviour of the animal meat cuts.

Methods

Preparation of Prototypes

Plant protein blocks were provided by KH Roberts, Singapore, manufactured with a Leistritz twin screw extruder. Briefly, protein sheets were produced with a blend of pea protein and wheat gluten and extruded under high moisture extrusion to form a protein block. Protein blocks were then sliced into sheets with a meat slicer. Sheets were microimprinted with micro-imprinting moulds, which were either made by metal machining or 3D printing. Sheets were coated with a thin layer of transglutaminase powder (Mega-Chem, Singapore), stacked, and allowed to bind in the fridge overnight. The meat cut prototypes formed were pulled apart by hand and the resulting structures photographed.

Preparation of Multi-Scale Engineered CMC Prototypes

The hydrogel forming the micro-sized fibres was prepared by mixing a slurry of 2% (w/v) whey protein (Optimum Nutrition, Singapore) and 2% (w/v) sodium alginate (Redman, Singapore) in deionized water and extruding with a 1 ml syringe and a 100 μm diameter nozzle into a 2% (w/v) calcium chloride (Redman, Singapore) bath to form wet spun fibres. Micro-sized fibres can alternatively be sourced from animal meat muscles or plant fibres. Muscle fibres were isolated as described in section 3.2. Plant fibres were manually isolated by peeling strands of about 200 μm diameter from young green jackfruits (Nature's Charm, Singapore).

To form milli-sized fibres, micro-sized fibres were mixed with a binder consisting of 2% (w/v) whey protein (Optimum Nutrition, Singapore), 2% (w/v) beef gelatine (Redman, Singapore) and 1% (w/v) sodium alginate (Redman, Singapore) in deionized water. The fibres were aligned by hand and crosslinked in 2% (w/v) calcium chloride (Redman, Singapore) to form bundles of about 20 micro-fibres each. Alternatively, milli-sized fibres can be formed by extruding the binder with a 1 ml syringe and a 20g needle into a 2% (w/v) calcium chloride (Redman, Singapore) bath to form fibres in one example.

To form macro-sized structures, milli-sized fibres were mixed with a binder consisting of 2% (w/v) whey protein (Optimum Nutrition, Singapore), 3% (w/v) beef gelatine (Redman, Singapore) and 1% (w/v) sodium alginate (Redman, Singapore) in deionized water. The fibres were aligned by hand and crosslinked in 2% (w/v) calcium chloride (Redman, Singapore) to form bundles of about 30 milli-fibres each. Alternatively, the binder could be mixed with sunflower oil (Fairprice, Singapore) at a concentration of 10% (v/v) and stirred for 5 minutes at room temperature until emulsified to form the marbled meat structure shown in one example. The macrostructure was additionally combined with an emulsified fat gel prepared by mixing sunflower oil (Fairprice, Singapore) at a concentration of 10% (v/v) with 2% (w/v) of beef gelatine (Redman, Singapore)

and 1% (w/v) of sodium alginate (Redman, Singapore) and stirred until emulsified, then chilled to solidify.

The solid emulsified fat gel was cut and combined with the macrostructure and crosslinked in in 2% (w/v) calcium chloride (Redman, Singapore) to form the fatty meat prototype in one example. Images of micro-sized fibres were obtained with an Olympus 1×70 inverted microscope. Images of milli-sized fibres and macro-sized structures were obtained using a Canon EOS 700D DSLR camera and 60 mm f/2.8 macro lens.

Results

Manufacturing of Alternative Meat Cuts by Micro-Imprinting

Significant features distinguishing whole cut-meat from minced meat are the presence of intact muscle fibres and the separation of these fibres upon cooking and mastication[1,2]. Precision engineering of muscle fibre-like structure using alternative proteins down to the hundreds of micrometre range is critical for recapitulating the fibre separation (FIG. 1) to mimic the ATM of whole-cut meat products[3].

Methods for structuring alternative proteins to produce whole meat cuts with high precision up to micrometre scale to recapitulate the ATM of meats are disclosed herein. Here, one such method is shown as an example (FIG. 2). Two-dimensional alternative protein sheets with meat-like texture are formed from plant-based and/or cell-based proteins by methods including but not limited to high moisture extrusion, extrusion calendaring, flat film extrusion, shear cell technology, solvent casting, and compression moulding.

Ingredients providing colour, flavour, and fat may be added to the protein sheets. Two-dimensional sheets are imprinted and/or cut by imprinting moulds or cutters to produce patterns of grooves ranging from micrometre to millimetre scales. FIG. 3 shows examples of micro-imprinting moulds used for microimprinting and removal of protein sheets respectively. Micro-imprinting moulds can be made of various materials and methods, such as machining of metal (FIG. 3A) and 3D printing of plastics (FIG. 3D). Imprinting is done by pressing the moulds on to a sheet of edible protein to create microgrooves (FIG. 3B-C). The patterns of grooves can consist of a combination of different indentations and/or cuts of varying number, depth, size, shape, and distance. FIG. 4 provides additional examples of micro-imprinting designs that can be used in the invention. The patterns of micro-imprinting moulds can vary in indentation, number of cuts, depth, size, shape and distance between cuts. This applies to both for flat micro-imprinting moulds, and for micro-imprinting rollers for continuous manufacturing applications.

Imprinted sheets may then be stacked in a controlled sequence and bound by food-grade binders to form a three-dimensional alternative whole meat cut. Micro-imprinting is shown to be crucial for mimicking the tearing behaviour of meat to replicate the ATM of meat (FIGS. 5 & 6). FIG. 5 compares a micro-imprinted protein sheet (FIG. 5A-B) with a positive control chicken sheet (FIG. 5C). It can be observed that the topographies at the edge of separation for the micro-imprinted sheet closely resembled that of the chicken after tearing. We further compared this with a negative control non-imprinted protein sheet which showed smooth edge of separation (FIG. 5D-E). The topographies at separation are important for imparting specific appearance, texture and mouthfeel (ATM) to the meat analogue to closely mimic meat.

Figure 7:
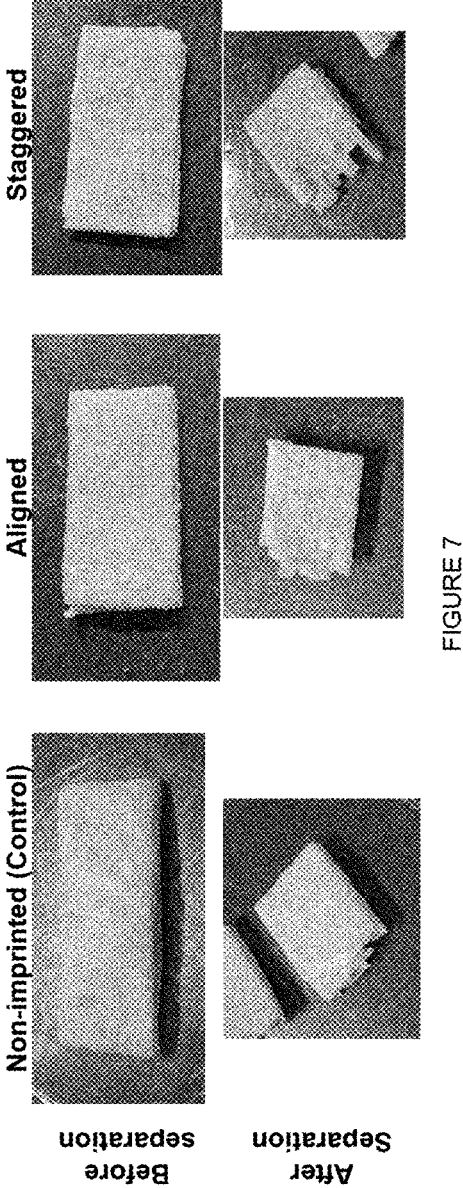
FIG. 7 shows a prototype of alternative meat cuts. Prototype composing of non-micro-imprinted soy protein sheets stacked (control), and micro-imprinted soy protein sheets stacked in an aligned and staggered fashion. Micro-imprinted grooves allow separation of soy protein along the grooves to mimic muscle meat fibre separation upon physical treatment. The staggered arrangement allows irregular breaks in the alternative meat cut mimicking muscle meat.

We have further shown that the sequence of stacking is important for meat-like fibre separation of alternative meat (FIG. 7). Controlling the sequence of stacking by staggering the sheets generates obvious muscle fibre-like structures compared to aligned stacking (in which the relative positions of the sheets are the same). Sequence of stacking may be optimized to generate different ways of meat-like fibre separation to mimic different types of meats. Food-grade binders may include plant-based edible hydrogels, edible synthetic hydrogels, tissues, proteins, extracellular matrices, and combinations thereof. Oils and fats can be included in the binders to provide marbling within the meat cut. Choice of binders, the amount and concentration used can be optimized to closely mimic muscle fibre separation upon mastication or heating, and to mimic different types of meats. Micro-imprinting of two-dimensional sheets allow use of scalable and precise imprinting technology while the binder allows reconstruction of 2D sheets into sizable 3D whole-cut meat structures. The resulting alternative whole meat cut recreates the ATM of meats including the separation of muscle fibre-like structures upon mastication, previously unattainable in existing meat substitutes.

Figure 8:
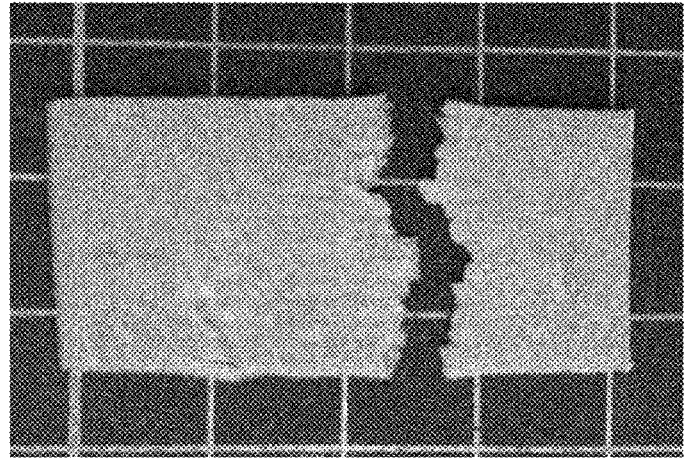
FIG. 8 shows tearing behaviour of micro-imprinted compared with continuous non-penetrating slicing (A) Continuous non-penetrating sliced protein sheet after tearing. (B) Micro-imprinted protein sheet after tearing.
Figure 8:
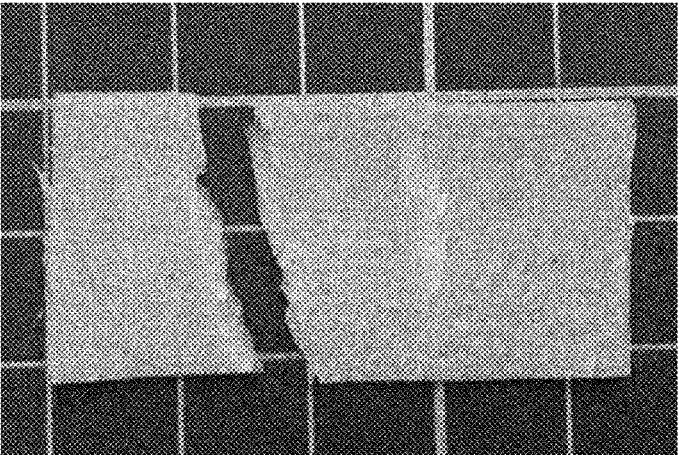

FIG. 8 compares tearing behaviour of micro-imprinted protein sheets with that of protein sheets sliced in a continuous fashion in a non-penetrating manner. Micro-imprinting methods are used to precisely generate micro-grooves including combinations of indentations and cuts, instead of continuous parallel cuts. We show here with a prototype, that combinations of indentations and cuts grants precision that allows more accurate meat cut-like fibre separation. The combinations also allow greater customizability by varying number, depth, size, shape, and distance of cuts and indentations to precisely mimic different types of meats. Accurate meat cut-like fibre separation previously not achievable may be achieved by the methods described herein.

Continuous manufacturing of alternative meat cuts by micro-imprinting with micro-grooves Alternative meat cuts made by micro-imprinting may be produced by precision engineering in a scalable manner. Disclosed here is a process flow and accompanying equipment design to enable continuous manufacturing of alternative meat cuts by micro-imprinting. Equipment for continuous manufacturing of alternative meat cuts by micro-imprinting comprises four elements:

(1) a device for forming of alternative protein sheets, for example a sheet forming element, such as high moisture extruder, extrusion calendar machine, flat film extruder, shear cell device, solvent casting device, and compression moulding device.

(2) a device for micro-imprinting, for example a surface modifying element, such as micro-grooved cutters, imprinting moulds, and/or lasers.

(3) a device for applying binders, for example a binder dispenser, such as a sprayer, a brush, an extruder, or a binder bath.

(4) a feature for stacking of protein sheets, for example an assembler, such as a layering system by rollers, by moving belts, by hand or by robotic parts.

An optional element is a cutter to form desired shapes and sizes, which can also be performed by hand. In the process, alternative protein sheets are produced by device (1) and run along a belt to contact with the micro-imprinting device (2), in this case a roller with designed grooves (FIG. 9). The micro-imprinting device imprints micro-grooves on the protein sheets and transfers it to another belt. A binder is applied to the surface of the sheet (3). Another micro imprinted sheet is then layered by moving belts on top of the previous sheet (4). The process is repeated by designing a circular belt or by employing multiple extruders arranged sequentially to continuously layer micro-imprinted sheets. The complete meat cut can then be cut into desired shape and size. Micro-imprinting enables precision engineering of the structure of alternative meat cuts, imparting micro-scale points of weakness for fibre separation during mastication or cooking. The continuous manufacturing process for micro-imprinting of 2D sheets and subsequent layering enables scalable large-scale manufacturing of precision engineered alternative meat cuts. The range of micro-scale for the imprinted features can be defined as fibre sizes between 1 to 1000 μm, and milli-scale for imprinted features can be defined as fiber sizes between 1 mm to 10 mm.

An example of a small-scale manufacturing of alternative meat cuts by micro-imprinting Alternative meat cuts made by micro-imprinting can be produced and customized at small scale to be used by restaurants and home cooks. Disclosed here is a process flow and an example of the accompanying equipment design to enable customizable small-scale manufacturing of alternative meat cuts by micro-imprinting (FIG. 10). Equip for small-scale manufacturing of alternative meat cuts by micro-imprinting will need four elements:

(1) Loading tray for pre-made alternative protein sheets with a device to move individual sheets (2) Device for micro-imprinting, for example a surface modifying element, such as micro-grooved cutters, imprinting moulds, and/or lasers.

(3) Device for applying binders, for example a binder dispenser, such as a sprayer, a brush, an extruder, or a binder bath.

(4) A feature for stacking of protein sheets, for example an assembler, such as a layering system by rollers, by moving belts, by hand or by robotic parts.

An optional component is a cutter to form desired shapes and sizes, which can also be performed by hand.

In the process, alternative protein sheets are pre-made by processes such as but not limited to high moisture extrusion, extrusion calendaring, flat film extrusion, shear cell technology, solvent casting, and compression moulding. The protein sheets can be customized with varying texture, flavour, nutrition, and appearance by changing the ingredients used, to mimic different types of meat. Pre-made protein sheets are than loaded on to the loading tray (1). The sheets are pushed towards a compartment with programmable grooves to imprint the designed patterns for each sheet. Grooves are of different shapes and sizes and can be programmed to be retracted or extended as the protein sheets moves through the compartment to imprint the designed pattern of grooves (2). The imprinted sheet is then transferred to a single-axis moveable stage powered by a linear actuator. A binder is applied to the surface of the sheet by a binder depositor (3). Another micro imprinted sheet is then layered on top of the previous sheet, with arrangement controlled by the single-axis movable stage. The process is then repeated to layer micro-imprinted sheets (4). The complete meat cut can be further cut into desired shape and sizes. The small-scale manufacturing method enables customizable micro-imprinting on the 2D sheets and subsequent layering to form sizable 3D precision engineered alternative meat cuts within reasonable time frames for use in restaurants and at home. Home chefs and professional chefs can personalize their dishes by combining different types of pre-made protein sheets, programming different micro-imprinting patterns to customize the flavour, texture, mouthfeel, nutrition, and appearance of the alternative meat.

Multi-Scale CMC Engineering Approach to Building Alternative Meat Cuts

Methods for structuring alternative proteins to produce whole meat cuts with high precision up to micrometre scale to recapitulate the ATM of meats are disclosed herein. Here, one such method is shown as an example. Muscle meats consist of bundles of myofibers surrounded by connective tissue to form muscle fascicles. This structure leads to the characteristic separation of meat into its fibres upon heating and mechanical treatment. Current approaches to building meat substitutes utilize extrusion and wet spinning to recreate the fibre of meat. However, these approaches often produce meats with homogenous composition and no clear separation of fibres upon heating or mechanical treatment. A multi-scale clean meat cut (CMC) engineering approach enables clear points of separation of fibres after heating and mechanical treatments (FIG. 11). The multi-scale engineered CMC consists of micro-sized fibres of 10-500 pm which forms the smallest building block of the engineered CMC. The micro-sized fibres can be obtained by cell or tissue culture with or without scaffold, by isolating muscle fibres from carcass animal tissue, by mixing cultured animal cells or tissues with a Binder A, or by structuring plant-based materials (FIG. 12). The micro-sized fibres are then aligned and bound together with a Binder B that is less stable than Binder A, tissue culture scaffolds and plant-based materials to form a milli-sized fibre. The milli-sized fibres are then aligned and bound together with a Binder C that is less stable than Binder B. The resulting product will behave similar to meat when heated or subjected to mechanical treatment. Due to less stability, Binder C will be degraded first, separating the milli-sized fibres held by Binder B. Upon further treatment, Binder B will degrade, separating the micro-sized fibres held by Binder A. These mimics the separation of muscle fascicles and myofibers upon cooking and shredding. Separation of meat into its fibres is a key characteristic of the meat-eating experience that is unique due to the structure of meat.

We demonstrated the multi-scale CMC engineering approach by building a meat substitute prototype with edible hydrogels. Micro-sized fibres of about 250 pm diameter were formed by wet-spinning alginate-whey protein solution in a calcium chloride water bath (FIG. 13A-B). About 20 micro-sized fibers were mixed with a binder consisting of a mixture of gelatin, alginate, and whey protein and cross-linked in a calcium chloride bath to form milli-sized fibers of about 3 mm dimeter (FIG. 13C). This gelatin-alginate-whey hydrogel is less stable than the alginate-whey hydrogel and thus degrades during heating to enable clear separation of micro-sized fibers (FIG. 13D). The milli-sized fibers were then further aligned and bound with a gelatin-alginate-whey hydrogel with more gelatin added to reduce its stability to form the macro-sized meat substitute with clear separation of fibers after cooking (FIG. 13E-F).

Two-Scale CMC Engineering Approach to Building Alternative Meat Cuts

Figures 13, 14:
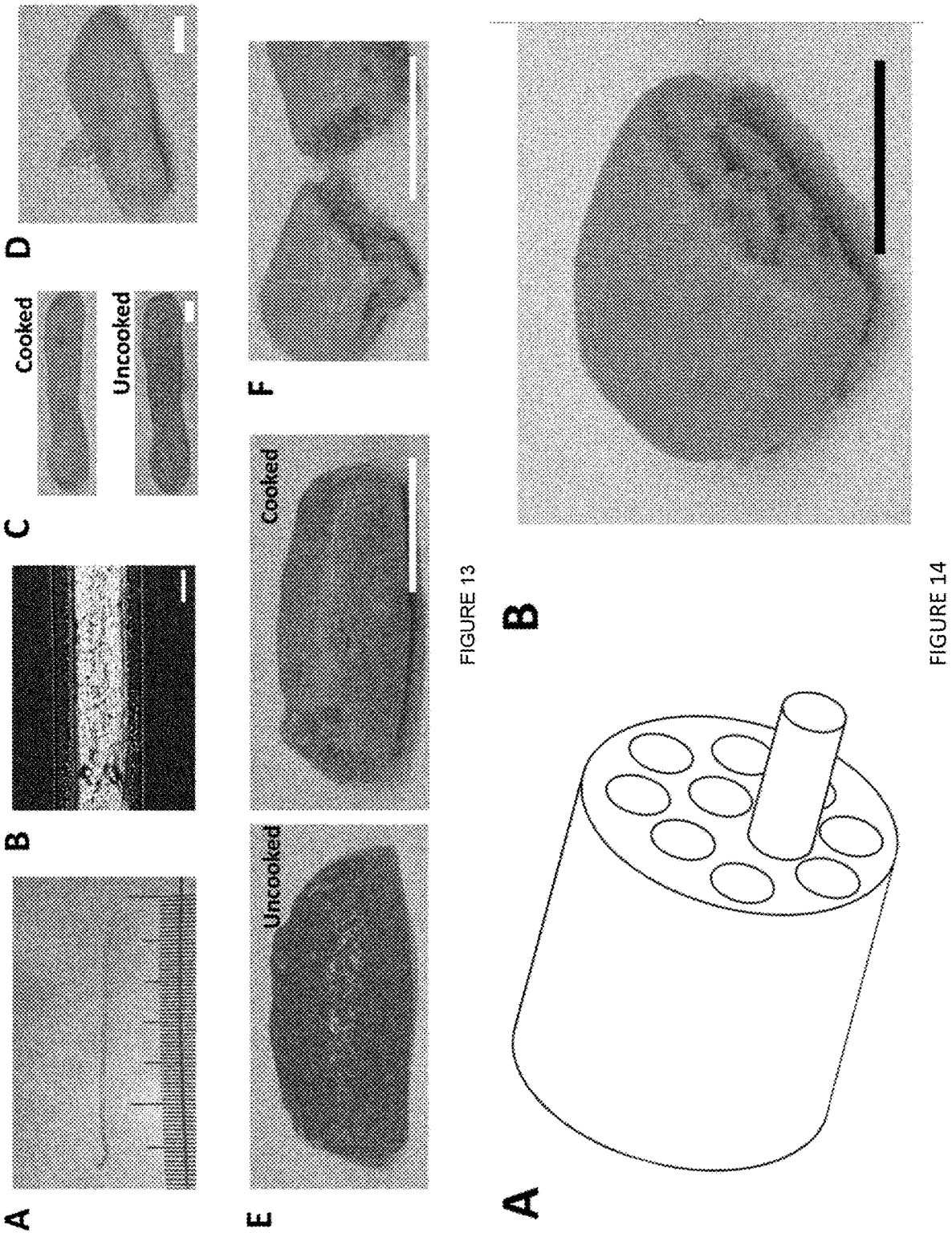
FIG. 13 shows multi-scale engineered CMC prototype demonstrates clear points of separation. (A-B) Micro-sized alginate1-whey protein2 fibres formed from wet spinning. Scale bar represents 100 pm. (C) Cooked and uncooked bundles of micro-sized fibers bound together with gelatin2-alginate1-whey protein2 binder. (D) Micro-sized fibers mimicking myofibers peeled from the milli-sized fibers after cooking. Scale bar represents 1 mm. (E) Cooked and uncooked macro-sized meat substitutes formed by bundles of milli-sized fibers bound together with gelatin3-alginate1-whey protein2 binder. (F) Cross section of macro-sized meat substitute showing clear separation of fibers. Scale bar represents 1 cm.
FIG. 14 shows that the two-scale CMC engineering approach enables clear separation of fibres. (A) Micro- or milli-sized fibres is bound by a binder to form meat substitutes with internal fibrous structure (B) Separation of fibres after cooking. Scale bar represents 1 cm. (C) Process flow of making the two-structure model.
Figure 14:
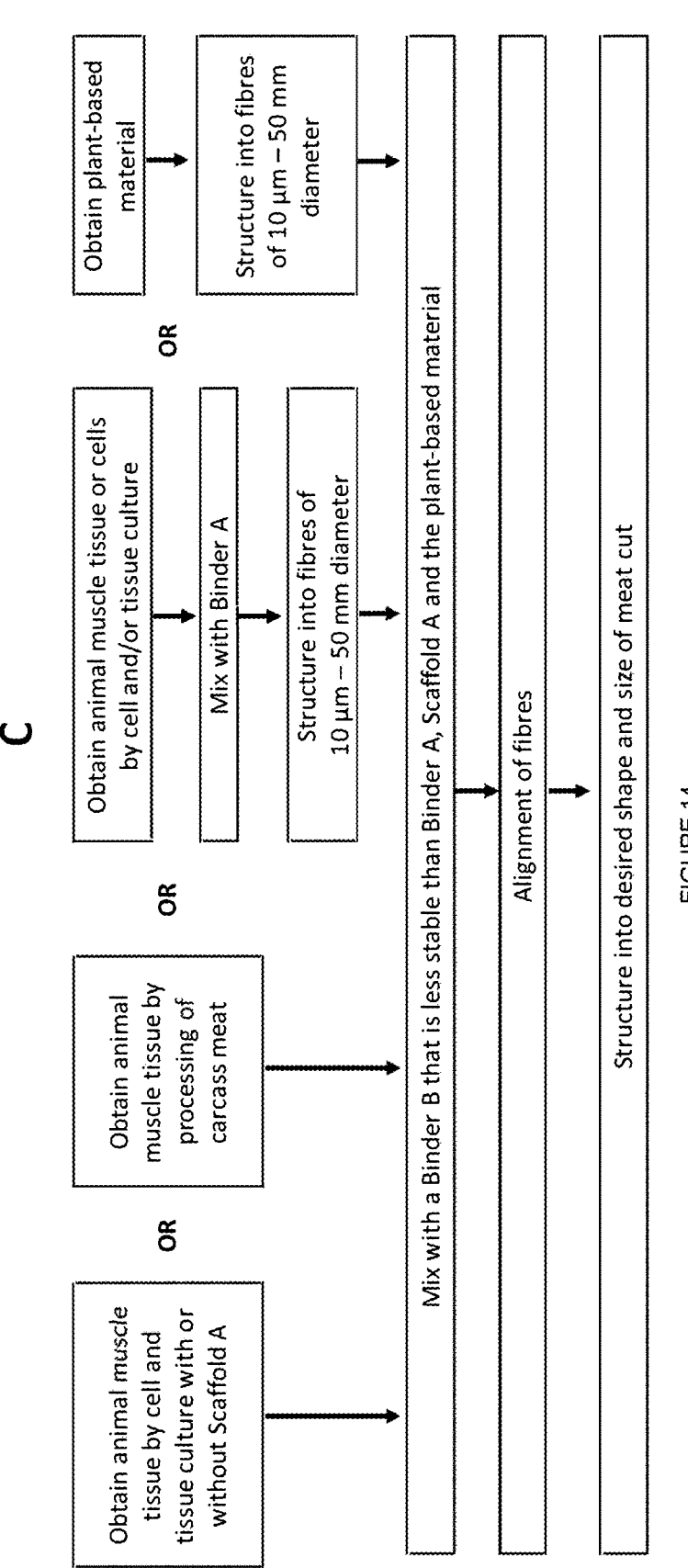

We further demonstrated a variation of the three-scale engineered CMC model by utilizing two binders instead of three binders to achieve the clear points of separation after heating. In this model, micro- to milli-sized fibres are directly aligned and bound together with a binder that is less stable than the material used to make the fibres (FIG. 14). The resulting product will behave similarly to animal muscle meat when heated or subjected to mechanical treatment. Due to less stability, the binder will be degraded first, separating the fibres, and mimicking the separation of muscle fascicles or myofibers upon cooking and shredding.

Incorporation of Fat in the Multi-Scale Engineered CMC Simulates Intramuscular Fat We further demonstrated that a fat component can be incorporated within the multi-scale engineered CMC model to simulate intramuscular fat to form marbled meats. In a marbled meat model, multi-scale engineered CMC framework will remain but with fat components in the form of emulsified fats incorporated within the Binder B (which binds the milli-structure) or Binder C (which binds the macro-structure) (FIG. 15).

Combination of Fat with the Multi-Scale Engineered CMC Simulates Intermuscular Fat We further demonstrated that a fat component can be combined with the multi-structure model to simulate intermuscular fat to form fatty meats. In a fatty meat model, the multi-scale engineered CMC framework will remain with possible incorporation of fat components in the form of emulsified fats within the Binder B (which binds the milli-structure) or Binder C (which binds the macro-structure), and with an additional binding of a separate mass of fat component with the macro-structure. This fat component can be in the form of animal adipose tissue, an emulsified fat hydrogel, or a tissue engineered adipose tissue.

Incorporation of Plant-Based Fibres in the Multi-Scale Engineered CMC Enables Hybrid Meat Cuts We further demonstrated that mixture of plant-based fibres and animal muscle fibres at the micro-scale can create a hybrid meat cut with precise points of separation to mimic meat accurately. In this model, instead of utilizing one type of fibre at the microscale, two or more types of fibres from different sources will be mixed and used to create a hybrid product (FIG. 17A-B). We demonstrated this by mixing isolated pork muscle micro-fibres with jackfruit plant micro-fibres and bound together with gelatin-alginate-whey protein binder to form a hybrid meat cut. Fibres clearly separate after cooking (FIG. 17C). This presents a new method of creating hybrid blended meats with increase precision in structural control compared to only blending minced meats and plant materials together, enabling creation of blended meat cuts.

REFERENCES

1. Characteristics of Thai indigenous and broiler chicken muscles. Poultry Science 84, 328-336, doi: https://doi.org/10.1093/ps/84.2.328 (2005).
2. Peha-Gonzalez, E., Alarcon-Rojo, A. D., Garcia-Galicia, I., Carrillo-Lopez, L. & Huerta-Jimenez, M. Ultrasound as a potential process to tenderize beef: Sensory and technological parameters. Ultrasonics Sonochemistry 53, 134-141, doi: https://doi.org/10.1016/j.ultsonch.2018.12.045 (2019).
3. Chen, J. Surface texture of foods: perception and characterization. Crit Rev Food Sci Nutr 47, 583-598, doi: 10.1080/10408390600919031 (2007).
4. Cornet, S. H. V. et al. Thermo-mechanical processing of plant proteins using shear cell and high-moisture extrusion cooking. Critical Reviews in Food Science and Nutrition, 1-18, doi: 10.1080/10408398.2020.1864618 (2021).
5. MacQueen, L. A. et al. Muscle tissue engineering in fibrous gelatin: implications for meat analogs npj Science of Food 3, 20, doi: 10.1038/S41538-019-0054-8 (2019).
6. Ben-Shitrit, E. T., Alexey. Meat Analogues and Methods of Producing the Same. (2020).

7. Scionti, G. Process of manufacturing edible microextruded product comprising protein, composition thereby obtained and use thereof. WO2020/030628A1 (2020).

8. Kang, D.-H. et al. Engineered Whole Cut Meats Assembled of Cell Fibers Constructed by Tendon-Gel Integrated Bioprinting. (In Review, 2020). K. Handral, H., Hua Tay, S., Wan Chan, W. & Choudhury, D. 3D Printing of cultured meat products. Critical Reviews in Food Science and Nutrition, 1-10, doi: 10.1080/10408398.2020.1815172 (2020).

9. Datar, I. & Betti, M. Possibilities for an in vitro meat production system. Innovative Food Science and Emerging Technologies 11, 13-22, doi: 10.1016/j.ifset.2009.10.007 (2010).

10. Aschemann-Witzel, J., Gantriis, R. F., Fraga, P. & Perez-Cueto, F. J. A. Plant-based food and protein trend from a business perspective: markets, consumers, and the challenges and opportunities in the future. Critical Reviews in Food Science and Nutrition, 1-10, doi: 10.1080/10408398.2020.1793730 (2020).

11. Ong, S., Choudhury, D. & Naing, M. W. Cell-based meat: Current ambiguities with nomenclature. Trends in Food Science & Technology 102, 223-231, doi: https://doi.org/10.1016/j.tifs.2020.02.010 (2020).

12. Ben-Arye, T. & Levenberg, S. Tissue Engineering for Clean Meat Production. Frontiers in Sustainable Food Systems 3, 46-46 (2019).

The invention claimed is:

1. A method of producing an artificial meat product comprising:
   a) providing multiple building blocks of edible protein, and
   b) combining the multiple building blocks with an edible binder, wherein the multiple building blocks are grooved sheets.

2. A method of producing an artificial meat product comprising:
   a) providing multiple building blocks of edible protein, wherein each of the multiple building blocks is a two-dimensional sheet,
   b) introducing grooves into surfaces of the multiple building blocks to form grooved sheets, c) combining the multiple building blocks with an edible binder by applying the edible binder to the grooved sheets, and
   d) assembling the grooved sheets to form the artificial meat product.

3. The method according to claim 1, wherein the grooved sheets have a thickness between 1 μm and 1000 μm.

4. The method according to claim 1, wherein the grooved sheets form linear fibrous structures in the artificial meat product.

5. The method according to claim 1, comprising:
   a) providing the multiple building blocks of the edible protein, wherein the building blocks are shaped into fibrils,
   b) combining the fibrils with a first edible binder to form fibers, and
   c) combining the fibers with a second edible binder to produce the artificial meat product.

6. The method according to claim 5, wherein the first edible binder is more stable than the second edible binder.

7. The method according to claim 1, wherein the artificial meat product comprises fibrous structures that separate upon cooking and/or mastication.

8. The method according to claim 1, wherein the artificial meat product displays the appearance, texture and mouthfeel (ATM) of natural cut meat.

9. The method according to claim 8, wherein the natural cut meat is from cattle, pig, sheep, poultry, duck, deer, rabbit, fish or other seafood.

10. The method according to claim 1, wherein the edible protein is one or more proteins selected from the group consisting of plant protein, animal cell protein and meat protein.

11. The method according to claim 1, wherein the edible binder is selected from the group consisting of plant-based hydrogels, synthetic hydrogels, tissues, proteins, extracellular matrices, and any combinations thereof.

12. The method according to claim 11, wherein the edible binder comprises alginate and whey protein.

13. The method according to claim 12, wherein the edible binder further comprises gelatin.

14. The method according to claim 1, wherein the artificial meat product further comprises oil and/or fat.

* * * * *